United States Patent
Caspi et al.

(10) Patent No.: US 10,193,902 B1
(45) Date of Patent: Jan. 29, 2019

(54) METHODS AND SYSTEMS FOR MALWARE DETECTION

(71) Applicant: DEEP INSTINCT LTD., Tel Aviv (IL)

(72) Inventors: Guy Caspi, Tel Aviv (IL); Yoel Neeman, Ra'anana (IL); Doron Cohen, Karkur (IL); Nadav Maman, Hod HaSharon (IL); Eli David, Holon (IL); Ishai Rosenberg, Rosh Ha'a'yin (IL)

(73) Assignee: DEEP INSTINCT LTD., Tel Aviv (IL)

( * ) Notice: Subject to any disclaimer, the term of this patent is extended or adjusted under 35 U.S.C. 154(b) by 102 days.

(21) Appl. No.: 14/929,902

(22) Filed: Nov. 2, 2015

(51) Int. Cl.
 *H04L 29/06* (2006.01)
 *G06N 3/08* (2006.01)

(52) U.S. Cl.
 CPC .......... *H04L 63/1416* (2013.01); *G06N 3/08* (2013.01)

(58) Field of Classification Search
 CPC ................................ G06F 21/56; G06F 21/53
 See application file for complete search history.

(56) References Cited

U.S. PATENT DOCUMENTS

| | | | |
|---|---|---|---|
| 8,306,931 B1 | 11/2012 | Bowman et al. | |
| 8,402,543 B1 * | 3/2013 | Ranjan | H04L 63/1416 709/223 |
| 9,336,483 B1 * | 5/2016 | Abeysooriya | G06N 3/08 |
| 9,378,079 B2 | 6/2016 | Ivanova et al. | |
| 9,401,020 B1 | 7/2016 | Li et al. | |
| 2013/0291111 A1 * | 10/2013 | Zhou | G06F 21/566 726/23 |
| 2014/0201126 A1 | 7/2014 | Zadeh et al. | |
| 2015/0242461 A1 * | 8/2015 | Kung | G06F 17/30982 707/769 |

(Continued)

FOREIGN PATENT DOCUMENTS

WO 2015/001544 1/2015

OTHER PUBLICATIONS

Deng, L. et al "Deep Learning: Methods and Applications" Foundations and Trends in Signal Processing 7: 3-4 (2014).

(Continued)

*Primary Examiner* — Hadi S Armouche
*Assistant Examiner* — Shaqueal D Wade
(74) *Attorney, Agent, or Firm* — Browdy and Neimark, P.L.L.C.

(57) ABSTRACT

According to some embodiments, a method for training a malware detector comprising a deep learning algorithm is described, which comprises converting a set of malware files and non malware files into vectors by using a feature based dictionary, and/or by using a conversion into an image, and providing prospects that the files constitute malware. Various features and combinations of features are described to build a feature based dictionary and adapt its size. According to some embodiments, a method for detecting a malware by using a malware detector comprising a deep learning algorithm is described, which comprises converting a file into a vector by using a feature based dictionary, and/or by using a conversion into an image, and providing prospects that the file constitutes malware. Methods for providing a plurality of prospects and aggregating these prospects are provided. Additional methods and systems in the field of malware detection are also described.

60 Claims, 24 Drawing Sheets

(56) References Cited

U.S. PATENT DOCUMENTS

| | | | | |
|---|---|---|---|---|
| 2015/0254555 A1* | 9/2015 | Williams, Jr. | ........ | G06N 3/0454 706/14 |
| 2016/0164901 A1* | 6/2016 | Mainieri | ................ | G06N 7/005 726/23 |
| 2017/0098074 A1* | 4/2017 | Okano | .................... | G06F 21/56 |

OTHER PUBLICATIONS

Bengio, Yoshua "Learning Deep Architectures for AI", Foundations and Trends in Machine Learning 2 (1):1-127 (2009).

Yann Lecun et al "Deep Learning" Nature 521, 436-444, (May 28 2015).

Wikipedia, https://en.wikipedia.org/wiki/Deep_learning (Sep. 16, 2015).

Vincent P. et al. "Stacked Denoising Autoencoders: Learning Useful Representations in a Deep Network with Local Denoising Criterion", , Journal of Machine Learning Research 11 :3371-340 (2010).

Larochelle et al "Classification using discriminative restricted Boltzmann machines" Proceedings of the 25th international conference on Machine learning, ICML '08, p. 536 (2008).

Hinton et al "A Fast Learning Algorithm for Deep Belief Nets", Neural Computation 18, 1527-1554 (2006).

Wikipedia, https://en.wikipedia.org/wiki/Restricted_Boltzmann_machine (Aug. 6, 2015).

Werbos, P et al "Beyond Regression: New Tools for Prediction and Analysis in the Behavioral Sciences" PhD thesis, Harvard Univ. 1-454 (Aug. 1974).

Parker, D. B. "Learning-Logic: Casting the Cortex of the Human Brain in Silicon" Report TR-47 MIT Press, (Feb. 1985).

Rumelhart, D. E., et al "Learning representations by back-propagating errors", Nature 323, 533-536 (1986).

https://en.wikipedia.org/wiki/Backpropagation (Sep. 16, 2015).

Davis, et al https://www.blackhat.com/docs/us-15/materials/us-15-Davis-Deep-Learning-On-Disassembly.pdf.

http://www.darkreading.com/vulnerabilities-threats/researchers-enlist-machine-learning-in-malware-detection/d/d-id/1321423.

Werbos "Backpropagation Through Time: What It Does and How to Do It", Proceedings of the IEEE, vol. 78, No. 10, (Oct. 1990).

* cited by examiner $F_1 =$
$F_2 =$
$F_3 =$
$F_4 =$
.
.
.
$F_n =$
Fig. 23
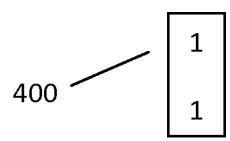
400
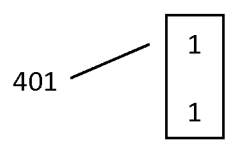
401
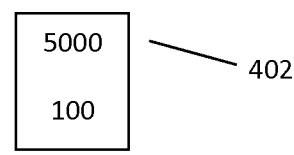
402
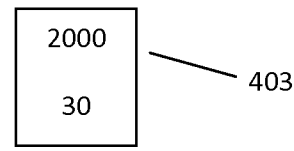
403
Fig. 24A            Fig. 24B

METHODS AND SYSTEMS FOR MALWARE DETECTION

TECHNICAL FIELD

The presently disclosed subject matter relates to the field of cyber security. In particular, it relates to the detection of malware.

BACKGROUND

Malware, short for malicious software, is a software or file used to disrupt computer operation, gather sensitive information, or gain access to private computer systems.

In order to protect computer operation, various methods and systems have been developed in the past to detect malware. The efficient detection of malware is highly challenging, since a vast number of new malware appear every day. For instance, it is believed that approximately 300.000 new malwares per day appeared in year 2014. Most of these malwares are variants of existing malwares.

FIG. 1 and FIG. 2 describe a prior art method for detecting malware. Most malware detectors which are currently used in the IT industry rely on the solution described in FIGS. 1 and 2.

A file "File 1" is received by the malware detector 1. The malware detector 1 includes a database 2 which stores a plurality of signatures 3. These signatures 3 each represent the content of known malware. For instance, "signature 1" represents the content of a known "malware 1".

The malware detector 1 compares the file "File 1" with each signature. If this comparison shows that the content of File 1 is the same as at least one of the signatures 3, the malware detector outputs a positive answer 4, meaning that File 1 is a malware. If not, the malware detector outputs a negative answer 5, meaning that File 1 is not a malware.

However, as indicated above, a large amount of new malware is created every day. It thus happens frequently that despite the fact that a file is malware, the malware detector is not able to detect it. Indeed, as the malware detector has never encountered such malware in the past, its database does not store a corresponding signature which could help it detect said malware. This is the case even if the new malware was created by making only small modifications to an existing and known malware for which the malware detector stores the corresponding signature.

After it appears that a file (see File 4 in FIG. 2) is a new malware which was not detected by the malware detector (for instance following an alert raised by the user to the malware detector maker), an update of the database has to be performed, to avoid such lack of detection in the future.

For this, a tedious effort, often using skilled professionals, is made to define a signature for this newly detected file (Signature 4 in FIG. 2). This analysis and definition are often based on heuristics and manual tuning. Once the new signature is defined, it is sent through a network (e.g. Internet) to all the users of the malware detector, in order to update their database. Typically, a few updates per day are sent to each user of the malware detector. This frequency may be higher depending on the number of newly created malware.

Other prior art solutions rely on the signature-based detection described with reference to FIGS. 1 and 2 and further perform additional processing of the file which may increase the time for detecting that the file constitutes malware.

These prior art solutions suffer from several drawbacks. Accordingly there is a need in the art to provide a new technique to detect malware.

GENERAL DESCRIPTION

In accordance with certain aspects of the presently disclosed subject matter, there is provided a method for building a dictionary, for adapting files to the input of a malware detector comprising a deep learning algorithm, comprising building a first size dictionary, by extracting features from a plurality of malware files and non malware files, reducing the size of the first size dictionary, in order to obtain a second size dictionary of a lower size, by selecting a subset of the features in the first size dictionary, wherein the second size dictionary dictates, for the files to be fed to the malware detector, the size and the content of vectors representing said files and suitable for being processed by the deep learning algorithm, for determining the prospects of whether said files constitute malware or not.

According to some embodiments, the features comprise strings, the first size dictionary being built by extracting strings present in the content of the plurality of malware files and non malware files. According to some embodiments, the features comprise operating codes of the malware files and non malware files, the first size dictionary being built by extracting operating codes of the plurality of malware files and non malware files. According to some embodiments, the features comprise strings present in the content of the plurality of malware files and non malware files, and operating codes of the malware files and non malware files. According to some embodiments, the features comprise features present in a header of the malware files and non malware files. According to some embodiments, the features comprise features present in a header of the malware files and non malware files, and strings present in the content of the malware files and non malware files. According to some embodiments, the features comprise features present in a header of the malware files and non malware files, and operating codes of malware files and non malware files. According to some embodiments, the size of the first size dictionary is reduced by using a statistical algorithm. According to some embodiments, the size of the first size dictionary is reduced by using a linear reduction algorithm. According to some embodiments, the size of the first size dictionary is reduced by using a non-linear reduction algorithm. According to some embodiments, the size of the first size dictionary is reduced by applying a combination of at least a statistical algorithm, a linear reduction algorithm and a non-linear reduction algorithm. According to some embodiments, the size of the first size dictionary is reduced by successively applying a statistical algorithm, a linear reduction algorithm and a non-linear reduction algorithm. According to some embodiments, the second size dictionary dictates a size and the content of a vector representing each malware file and non malware file, for real time processing of each vector by the deep learning algorithm. According to some embodiments, the prospects comprise, for each file, a probability that said file constitutes malware. According to some embodiments, the malware files and non malware files are operable on different operating systems and the features are independent of the operating systems so that the first size dictionary and the second size dictionary are built irrespective of the operating systems. According to some embodiments, the malware detector determines the prospects of a file to constitute malware even if it has never previously received said file as an input.

In accordance with some aspects of the presently disclosed subject matter, there is provided a method for building vectors for feeding a malware detector comprising a deep learning algorithm, the method comprising, for a plurality of files to be fed to the malware detector, extracting features from each file based on features present in a dictionary, building a vector representing said each file based on the extracted features, said vector being suitable for being processed by the deep learning algorithm, for determining the prospects of whether said file constitutes malware or not.

According to some embodiments, each file comprises a header, and the features comprise parts of said header. According to some embodiments, the features comprise operating codes of the files. According to some embodiments, the features comprise strings present in the content of the files. According to some embodiments, the features comprise strings present in the content of the files and operating codes of the files. According to some embodiments, the features comprise strings present in the content of the files and parts of a header of the files. According to some embodiments, the features comprise features present in a header of the files, and operating codes of the files. According to some embodiments, the files comprise malware files and non malware files, and the dictionary dictates a size and the content of a vector representing each malware file and non malware file, for real time processing of each vector by the deep learning algorithm. According to some embodiments, the prospects comprise, for each file, a probability that said file constitutes malware. According to some embodiments, the files are operable on different operating systems and the features are independent of the operating systems so that a vector is built for each file based on the dictionary irrespective of the file operating system. According to some embodiments, the comprises feeding a plurality of vectors representing a plurality of malware files and non malware files to the deep learning algorithm, and updating a model used by the deep learning algorithm, based on the comparison between prospects provided by the deep learning algorithm whether each file constitutes malware, and a real malware status of each file. According to some embodiments, the method comprises feeding a vector representing a file to the deep learning algorithm, and providing prospects of whether said file constitutes malware or not. According to some embodiments, the method comprises feeding a vector representing a file to the deep learning algorithm, and providing prospects of whether said file constitutes malware or not, even if it has never previously received said file as an input.

In accordance with some aspects of the presently disclosed subject matter, there is provided a method for building vectors for feeding a malware detector comprising a deep learning algorithm, the method comprising, for a plurality of files to be fed to the malware detector, extracting raw binary data from each file, converting the raw binary data into an image representing said raw binary data, and reducing the size of each image into a fixed size vector, the vector being suitable for being processed by the deep learning algorithm, for determining the prospects of whether said file constitutes malware or not.

According to some embodiments, the method comprises feeding a plurality of vectors representing a plurality of malware files and non malware files to the deep learning algorithm, and updating a model used by the deep learning algorithm, based on the comparison between prospects provided by the deep learning algorithm whether each file constitutes malware, and a real malware status of each file.

According to some embodiments, the method comprises feeding a vector representing a file to the deep learning algorithm, and providing prospects of whether said file constitutes malware or not. According to some embodiments, the method comprises feeding a vector representing a file to the deep learning algorithm, and providing prospects of whether said file constitutes malware or not even if it has never previously received said file as an input.

In accordance with some aspects of the presently disclosed subject matter, there is provided a method for training a malware detector comprising a deep learning algorithm, the method comprising extracting features from each file among a plurality of malware and non malware files, based on features present in at least a dictionary, building vectors based on the extracted features, each vector representing a file, feeding the vectors to the deep learning algorithm, for providing prospects of whether said file constitutes malware or not, updating a model used by the deep learning algorithm, based on the comparison between prospects provided by the deep learning algorithm whether each file constitutes malware, and a real malware status of each file, for training the malware detector to provide prospects of whether a file constitutes malware or not.

According to some embodiments, each file comprises a header, and the features are parts of said header. According to some embodiments, features comprise operating codes of the files. According to some embodiments, the features comprise strings present in the content of the files. According to some embodiments, the features comprise strings present in the content of the files and operating codes of the files. According to some embodiments, the features comprise strings present in the content of the files and parts of a header of the files. According to some embodiments, the features comprise features present in a header of the files, and operating codes of the files. According to some embodiments, the method comprises building a first size dictionary, by extracting features from a plurality of malware files and non malware files, and reducing the size of the first size dictionary, in order to obtain the said dictionary by selecting a subset of the features in the first size dictionary, the said dictionary being of lower size than the first size dictionary. According to some embodiments, the files are operable on different operating systems and the features are independent of the operating systems so that a vector is built for each file based on the said dictionary irrespective of the file operating system. According to some embodiments, the method comprises extracting first features from each file among a plurality of malware and non malware files, based on features present in a first dictionary, extracting second features from each file based on features present in a second dictionary, and building vectors based on the first and second extracted features, each vector representing a file.

In accordance with some aspects of the presently disclosed subject matter, there is provided a method for training a malware detector comprising a deep learning algorithm, the method comprising extracting features from each file among a plurality of malware and non malware files, based on features present in at least a dictionary, building vectors based on the extracted features, each vector representing a file, feeding the vectors to the deep learning algorithm, for providing an estimation of the nature of each file, and updating a model used by the deep learning algorithm, based on the comparison between an estimation provided by the deep learning algorithm on the nature of each file and a known nature of the files.

According to some embodiments, the nature of the file is the reputation of the file.

In accordance with some aspects of the presently disclosed subject matter, there is provided a method for training a malware detector comprising a deep learning algorithm and a scoring module, the method comprising, for files among a plurality of malware files and non malware files, extracting features from each file based on features present in a first dictionary, in order to build a first set of vectors representing each file, feeding the first set of vectors to the deep learning algorithm, obtaining a first set of prospects on whether the files are malware or not, extracting features from said each file based on features present in a second dictionary, the second dictionary being different from the first dictionary, in order to build a second set of vectors representing each file, feeding the second set of vectors to the deep learning algorithm, obtaining a second set of prospects on whether the files are malware or not, and updating a neural network used by the scoring module, based on at least the first set of prospects and the second set of prospects, for training the scoring module to provide a decision of whether a file constitutes malware or not.

In accordance with some aspects of the presently disclosed subject matter, there is provided a method for training a malware detector comprising a deep learning algorithm and a scoring module, the method comprising, for each file among a plurality of malware files and non malware files, extracting features from said each file based on features present in a first dictionary, in order to build a first set of vectors representing each file, feeding the first set of vectors to the deep learning algorithm, obtaining a first set of prospects on whether the files are malware or not, extracting raw binary data from said each file, converting the raw binary data into an image representing said raw binary data, building a second set of vectors based on each image, feeding the second set of vectors to the deep learning algorithm, obtaining a second set of prospects on whether the files constitutes malware or not, and updating a neural network used by the scoring module, based on at least the first set of prospects and the second set of prospects, for training the scoring module to provide a decision of whether a file constitutes malware or not.

In accordance with some aspects of the presently disclosed subject matter, there is provided a method for detecting malware, comprising extracting features from a file based on features present in at least a dictionary, building a vector based on the extracted features, feeding the vector to a malware detector comprising a deep learning algorithm, and determining the prospects of whether said file constitutes malware or not.

According to some embodiments, each file comprises a header, and the features are parts of said header. According to some embodiments, the features comprise operating codes of the files. According to some embodiments, the features comprise strings present in the content of the files. According to some embodiments, the features comprise strings present in the content of the files and operating codes of the files. According to some embodiments, the features comprise strings present in the content of the files and parts of a header of the files. According to some embodiments, the features comprise parts of a header of the files, and operating codes of the files. According to some embodiments, the prospects comprise at least a probability that said file is a malware or not. According to some embodiments, the files fed to the malware detector are operable on different operating systems and the features are independent of the operating systems so that a vector is built for each file based on the dictionary irrespective of the file operating system. According to some embodiments, the method comprises providing prospects of whether a file constitutes malware or not even if the malware detector has never previously received said file as an input. According to some embodiments, the method comprises extracting first features from each file based on features present in a first dictionary, extracting second features from each file based on features present in a second dictionary, and building vectors based on at least the first and second extracted features, each vector representing a file. According to some embodiments, wherein the determination of the prospects of a file to constitute malware is done in real time.

In accordance with some aspects of the presently disclosed subject matter, there is provided a method for detecting malware, comprising extracting features of a file operating on a given operating system, based on features present in a dictionary and being independent of said operating system, building a vector based on the extracted features, feeding the vector to a malware detector comprising a deep learning algorithm, and determining the prospects of whether said file constitutes malware or not.

In accordance with some aspects of the presently disclosed subject matter, there is provided a method for detecting malware, comprising extracting first features from a file based on features present in a first dictionary, building a vector based on the first features, feeding the vector to the deep learning algorithm, for providing first prospects on whether the file constitutes malware or not, extracting second features from the file based on features present in a second dictionary which is different from the first dictionary, building a vector based on the second features, feeding the vector to the deep learning algorithm, for providing second prospects on whether the file constitutes malware or not, providing a result on whether the file constitutes malware or not, based on at least the first and second prospects.

According to some embodiments, the result is provided by a neural network which aggregates at least the first and second prospects. According to some embodiments, wherein the result is a binary result which is provided based on the prospects whose confidence level is the highest. According to some embodiments, the result is a binary result which is provided based on a voting method. According to some embodiments, the features of the first dictionary and the second dictionary comprise operating codes of the file, or strings present in the content of the file, or strings present in the content of the files and operating codes of the file, strings present in the content of the files and parts of a header of the file, parts of a header of the file, and operating codes of the file. According to some embodiments, the method comprises feeding a plurality of files to the malware detector that are operable on different operating systems, wherein the features of the first dictionary and the second dictionary are independent of the operating systems. According to some embodiments, the method comprises providing a result of whether a file constitutes malware or not even if the malware detector has never previously received said file as an input.

In accordance with some aspects of the presently disclosed subject matter, there is provided a method for detecting malware by a malware detector comprising a deep learning algorithm, comprising extracting first features from a file based on features present in a first dictionary, building at least a vector based on the first features, feeding the vector to the deep learning algorithm, for providing first prospects on whether the file constitutes malware or not, extracting raw binary data from said file, converting the raw binary data into an image representing said raw binary data, building a second vector based on the image, feeding the second vector to the deep learning algorithm, for obtaining a second prospect on whether the file constitutes malware or not, providing a binary result on whether the file constitutes malware or not, based on at least the first and second prospects.

In accordance with some aspects of the presently disclosed subject matter, there is provided a system for building a dictionary, for adapting files to the input of a malware detector comprising a deep learning algorithm, the system being configured to build a first size dictionary, by extracting features from a plurality of malware files and non malware files, reduce the size of the first size dictionary, in order to obtain a second size dictionary of a lower size, by selecting a subset of the features in the first size dictionary, wherein the second size dictionary dictates, for the files to be fed to the malware detector, the size and the content of vector representing said files and suitable for being processed by the deep learning algorithm, for determining the prospects of whether said files constitute malware or not.

According to some embodiments, the features comprise strings, the first size dictionary being built by extracting strings present in the content of the plurality of malware files and non malware files. According to some embodiments, the features comprise operating codes of the malware files and non malware files, the first size dictionary being built by extracting operating codes of the plurality of malware files and non malware files. According to some embodiments, the features comprise strings present in the content of the plurality of malware files and non malware files, and operating codes of the plurality of malware files and non malware files.

According to some embodiments, the features comprise features present in a header of the malware files and non malware files. According to some embodiments, the features comprise features present in a header of the malware files and non malware files, and strings present in the content of the malware files and non malware files. According to some embodiments, the features comprise features present in a header of the malware files and non malware files, and operating codes of the malware files and non malware files. According to some embodiments, the system is configured to reduce the size of the first size dictionary by using a statistical algorithm. According to some embodiments, the system is configured to reduce the size of the first size dictionary by using a linear reduction algorithm. According to some embodiments, the system is configured to reduce the size of the first size dictionary by using a non-linear reduction algorithm. According to some embodiments, the system is configured to reduce the size of the first size dictionary by applying a combination of at least a statistical algorithm, a linear reduction algorithm and a non-linear reduction algorithm. According to some embodiments, the system is configured to reduce the size of the first size dictionary by successively applying a statistical algorithm, a linear reduction algorithm and a non-linear reduction algorithm. According to some embodiments, the second size dictionary dictates a size and the content of a vector representing each malware file and non malware file, for real time processing of each vector by the deep learning algorithm. According to some embodiments, the prospects comprise, for each file, a probability that said file constitutes malware. According to some embodiments, the malware files and non malware files are operable on different operating systems and the features are independent of the operating systems so that the first size dictionary and the second size dictionary are built irrespective of the operating systems. According to some embodiments, the malware detector is configured to determine the prospects of a file to be a malware even if it has never previously received said file as an input.

In accordance with some aspects of the presently disclosed subject matter, there is provided a system for building vectors for feeding a malware detector comprising a deep learning algorithm, the system being configured, for a plurality of files to be fed to the malware detector, to extract features from each file based on features present in a dictionary, and build a vector representing said each file based on the extracted features, said vector being suitable for being processed by the deep learning algorithm, for determining the prospects of whether said file constitutes malware or not. According to some embodiments, each file comprises a header, and the features comprise parts of said header. According to some embodiments, the features comprise operating codes of the files. According to some embodiments, the features comprise strings present in the content of the files. According to some embodiments, the features comprise strings present in the content of the files and operating codes of the files. According to some embodiments, the features comprise strings present in the content of the files and parts of a header of the files. According to some embodiments, the features comprise features present in a header of the files, and operating codes of the files. According to some embodiments, the files comprise malware files and non malware files, and the dictionary dictates a size and the content of a vector representing each malware file and non malware file, for real time processing of each vector by the deep learning algorithm. According to some embodiments, the prospects comprise, for each file, a probability that said file constitutes malware. According to some embodiments, the files are operable on different operating systems and the features are independent of the operating systems so that a vector is built for each file based on the dictionary irrespective of the file operating system. According to some embodiments, the system is further configured to feed a plurality of vectors representing a plurality of malware files and non malware files to the deep learning algorithm, and update a model used by the deep learning algorithm, based on the comparison between prospects provided by the deep learning algorithm whether each file constitutes malware, and a real malware status of each file. According to some embodiments, the system is further configured to feed a vector representing a file to the deep learning algorithm, and provide prospects of whether said file constitutes malware or not. According to some embodiments, the system is further configured to feed a vector representing a file to the deep learning algorithm, and provide prospects of whether said file constitutes malware or not, even if it has never previously received said file as an input.

In accordance with some aspects of the presently disclosed subject matter, there is provided a system for building vectors for feeding a malware detector comprising a deep learning algorithm, the system being configured, for a plurality of files to be fed to the malware detector, to extract raw binary data from each file, convert the raw binary data into an image representing said raw binary data, and reduce the size of each image into a fixed size vector, the vector being suitable for being processed by the deep learning algorithm, for determining the prospects of whether said file constitutes malware or not.

According to some embodiments, the system is further configured to feed a plurality of vectors representing a plurality of malware files and non malware files to the deep learning algorithm, and update a model used by the deep learning algorithm, based on the comparison between prospects provided by the deep learning algorithm whether each file constitutes malware, and a real malware status of each file. According to some embodiments, the system is further configured to feed a vector representing a file to the deep learning algorithm, and provide prospects of whether said file constitutes malware or not. According to some embodiments, the system is further configured to feed a vector representing a file to the deep learning algorithm, and provide prospects of whether said file constitutes malware or not, even if it has never previously received said file as an input.

In accordance with some aspects of the presently disclosed subject matter, there is provided a system for training a malware detector comprising a deep learning algorithm, the system being configured to extract features from each file among a plurality of malware and non malware files, based on features present in at least a dictionary, build vectors based on the extracted features, each vector representing a file, feed the vectors to the deep learning algorithm, for providing prospects of whether said file constitutes malware or not, and update a model used by the deep learning algorithm, based on the comparison between prospects provided by the deep learning algorithm whether each file constitutes malware, and a real malware status of each file, for training the malware detector to provide prospects of whether a file constitutes malware or not.

According to some embodiments, each file comprises a header, and the features are parts of said header. According to some embodiments, the features comprise operating codes of the files. According to some embodiments, the features comprise strings present in the content of the files. According to some embodiments, the features comprise strings present in the content of the files and operating codes of the files. According to some embodiments, the features comprise strings present in the content of the files and parts of a header of the files. According to some embodiments, the features comprise features present in a header of the files, and operating codes of the files. According to some embodiments, the system is configured to build a first size dictionary, by extracting features from a plurality of malware files and non malware files, reduce the size of the first size dictionary, in order to obtain the said dictionary by selecting a subset of the features in the first size dictionary, the said dictionary being of lower size than the first size dictionary. According to some embodiments, the files are operable on different operating systems and the features are independent of the operating systems so that a vector is built for each file based on the said dictionary irrespective of the file operating system. According to some embodiments, the system is further configured to extract first features from each file among a plurality of malware and non malware files, based on features present in a first dictionary, extract second features from each file based on features present in a second dictionary, and build vectors based on at least the first and second extracted features, each vector representing a file.

In accordance with some aspects of the presently disclosed subject matter, there is provided a system for training a malware detector comprising a deep learning algorithm, the system being configured to extract features from each file among a plurality of malware and non malware files, based on features present in at least a dictionary, build vectors based on the extracted features, each vector representing a file, feed the vectors to the deep learning algorithm, for providing an estimation of the nature of each file, and update a model used by the deep learning algorithm, based on the comparison between an estimation provided by the deep learning algorithm on the nature of each file and a known nature of the files.

According to some embodiments, the nature of the file is the reputation of the file.

In accordance with some aspects of the presently disclosed subject matter, there is provided a system for training a malware detector comprising a deep learning algorithm and a scoring module, the system being configured, for each file among a plurality of malware files and non malware files, to extract features from said each file based on features present in a first dictionary, in order to build a first set of vectors representing each file, feed the first set of vectors to the deep learning algorithm, obtain a first set of prospects on whether the files constitute malware or not, extract features from said each file based on features present in a second dictionary, the second dictionary being different from the first dictionary, in order to build a second set of vectors representing each file, feed the second set of vectors to the deep learning algorithm, obtain a second set of prospects on whether the files constitute malware or not, and update a neural network used by the scoring module, based on at least the first set of prospects and the second set of prospects, for training the scoring module to provide a decision of whether a file constitute malware or not.

In accordance with some aspects of the presently disclosed subject matter, there is provided a system for training a malware detector comprising a deep learning algorithm and a scoring module, the system being configured, for each file among a plurality of malware files and non malware files, to extract features from said each file based on features present in a first dictionary, in order to build a first set of vectors representing each file, feed the first set of vectors to the deep learning algorithm, obtain a first set of prospects on whether the files constitute malware or not, extract raw binary data from said each file, convert the raw binary data into an image representing said raw binary data, build a second set of vectors based on each image, feed the second set of vectors to the deep learning algorithm, obtain a second set of prospects on whether the files are malware or not, update a neural network used by the scoring module, based on at least the first set of prospects and the second set of prospects, for training the scoring module to provide a decision of whether a file constitutes a malware or not.

In accordance with some aspects of the presently disclosed subject matter, there is provided a system for detecting malware, the system comprising a malware detector comprising a deep learning algorithm, the system being configured to extract features from a file based on features present in at least a dictionary, build a vector based on the extracted features, feed the vector to the deep learning algorithm of the malware detector, and determine the prospects of whether said file constitutes malware or not.

According to some embodiments, each file comprises a header, and the features comprise parts of said header. According to some embodiments, the features comprise operating codes of the files. According to some embodiments, the features comprise strings present in the content of the files. According to some embodiments, the features comprise strings present in the content of the files and operating codes of the files. According to some embodiments, the features comprise strings present in the content of the files and parts of a header of the files. According to some embodiments, the features comprise parts of a header of the files, and operating codes of the files. According to some embodiments, the prospects comprise, for each file, a probability that said file constitutes malware. According to some embodiments, the files fed to the malware detector are operable on different operating systems and the features are independent of the operating systems so that a vector is built for each file based on the dictionary irrespective of the file operating system. According to some embodiments, the system is configured to provide prospects of whether a file constitutes malware or not, even if the malware detector has never previously received said file as an input.

According to some embodiments, the system is configured extract first features from each file based on features present in a first dictionary, extract second features from each file based on features present in a second dictionary, and build vectors based on at least the first and second extracted features, each vector representing a file. According to some embodiments, the system is configured the determination of the prospects of a file to constitute malware is done in real time.

In accordance with some aspects of the presently disclosed subject matter, there is provided a system for detecting malware, the system comprising a malware detector comprising a deep learning algorithm, the system being configured to extract first features from a file based on features present in a first dictionary, build a vector based on the first features, feed the vector to the deep learning algorithm, for providing first prospects on whether the file constitutes malware or not, extract second features from the file based on features present in a second dictionary which is different from the first dictionary, build a vector based on the second features, feed the vector to the deep learning algorithm, for providing second prospects on whether the file constitutes malware or not, and provide a result on whether the file constitutes malware or not, based on at least the first and second prospects.

According to some embodiments, the result is provided by a neural network, which is configured to aggregate at least the first and second prospects. According to some embodiments, the result is a binary result which is provided based on the prospects whose confidence level is the highest. According to some embodiments, the result is a binary result which is provided based on a voting method. According to some embodiments, the features of the first dictionary and the second dictionary comprise operating codes of the file, or strings present in the content of the file, or strings present in the content of the files and operating codes of the file, or strings present in the content of the files and parts of a header of the file, or parts of a header of the file, and operating codes of the file. According to some embodiments, the system is configured to feed a plurality of files to the malware detector that are operable on different operating systems, wherein the features of the first dictionary and the second dictionary are independent of the operating systems. According to some embodiments, the system is configured to provide a binary result of whether a file constitutes malware or not, even if the malware detector has never previously received said file as an input.

In accordance with some aspects of the presently disclosed subject matter, there is provided a system for detecting malware, the system comprising a malware detector comprising a deep learning algorithm, the system being configured to extract first features from a file based on features present in a first dictionary, build at least a vector based on the first features, feed the vector to the deep learning algorithm, for providing first prospects on whether the file constitutes malware or not, extract raw binary data from said file, convert the raw binary data into an image representing said raw binary data, build a second vector based on the image, feed the second vector to the deep learning algorithm, for obtaining a second prospects on whether the file constitutes malware or not, and provide a result on whether the file constitutes malware or not, based on at least the first and second prospects.

In accordance with some aspects of the presently disclosed subject matter, there is provided a system for detecting malware, comprising a malware detector comprising a deep learning algorithm, the system being configured to extract raw binary data from a file, convert the raw binary data into an image representing said raw binary data, build at least a vector based on said image, feed the vector to the deep learning algorithm, and obtain prospects on whether the file constitutes malware or not.

In accordance with some aspects of the presently disclosed subject matter, there is provided a non-transitory storage device readable by a machine, tangibly embodying a program of instructions executable by the machine to perform a method for building a dictionary, for adapting files to the input of a malware detector comprising a deep learning algorithm, comprising building a first size dictionary, by extracting features from a plurality of malware files and non malware files, reducing the size of the first size dictionary, in order to obtain a second size dictionary of a lower size, by selecting a subset of the features in the first size dictionary, wherein the second size dictionary dictates, for the files to be fed to the malware detector, the size and the content of vectors representing said files and suitable for being processed by the deep learning algorithm, for determining the prospects of whether said files constitute malware or not.

In accordance with some aspects of the presently disclosed subject matter, there is provided a non-transitory storage device readable by a machine, tangibly embodying a program of instructions executable by the machine to perform a method for building vectors for feeding a malware detector comprising a deep learning algorithm, the method comprising, for a plurality of files to be fed to the malware detector, extracting features from each file based on features present in a dictionary, building a vector representing said each file based on the extracted features, said vector being suitable for being processed by the deep learning algorithm, for determining the prospects of whether said file constitutes malware or not.

In accordance with some aspects of the presently disclosed subject matter, there is provided a non-transitory storage device readable by a machine, tangibly embodying a program of instructions executable by the machine to perform a method for building vectors for feeding a malware detector comprising a deep learning algorithm, the method comprising, for a plurality of files to be fed to the malware detector, extracting raw binary data from each file, converting the raw binary data into an image representing said raw binary data, and reducing the size of each image into a fixed size vector, the vector being suitable for being processed by the deep learning algorithm, for determining the prospects of whether said file constitutes malware or not.

In accordance with some aspects of the presently disclosed subject matter, there is provided a non-transitory storage device readable by a machine, tangibly embodying a program of instructions executable by the machine to perform a method for training a malware detector comprising a deep learning algorithm, the method comprising extracting features from each file among a plurality of malware and non malware files, based on features present in at least a dictionary, building vectors based on the extracted features, each vector representing a file, feeding the vectors to the deep learning algorithm, for providing prospects of whether said file constitutes malware or not, and updating a model used by the deep learning algorithm, based on the comparison between prospects provided by the deep learning algorithm whether each file constitutes malware, and a real malware status of each file, for training the malware detector to provide prospects of whether a file constitutes malware or not.

In accordance with some aspects of the presently disclosed subject matter, there is provided a non-transitory storage device readable by a machine, tangibly embodying a program of instructions executable by the machine to perform a method for training a malware detector comprising a deep learning algorithm, the method comprising extracting features from each file among a plurality of malware and non malware files, based on features present in at least a dictionary, building vectors based on the extracted features, each vector representing a file, feeding the vectors to the deep learning algorithm, for providing an estimation of the nature of each file, and updating a model used by the deep learning algorithm, based on the comparison between an estimation provided by the deep learning algorithm on the nature of each file and a known nature of the files.

In accordance with some aspects of the presently disclosed subject matter, there is provided a non-transitory storage device readable by a machine, tangibly embodying a program of instructions executable by the machine to perform a method for training a malware detector comprising a deep learning algorithm and a scoring module, the method comprising, for files among a plurality of malware files and non malware files, extracting features from each file based on features present in a first dictionary, in order to build a first set of vectors representing each file, feeding the first set of vectors to the deep learning algorithm, obtaining a first set of prospects on whether the files are malware or not, extracting features from said each file based on features present in a second dictionary, the second dictionary being different from the first dictionary, in order to build a second set of vectors representing each file, feeding the second set of vectors to the deep learning algorithm, obtaining a second set of prospects on whether the files are malware or not, and updating a neural network used by the scoring module, based on at least the first set of prospects and the second set of prospects, for training the scoring module to provide a decision of whether a file constitutes malware or not.

In accordance with some aspects of the presently disclosed subject matter, there is provided a non-transitory storage device readable by a machine, tangibly embodying a program of instructions executable by the machine to perform a method for training a malware detector comprising a deep learning algorithm and a scoring module, the method comprising, for each file among a plurality of malware files and non malware files, extracting features from said each file based on features present in a first dictionary, in order to build a first set of vectors representing each file, feeding the first set of vectors to the deep learning algorithm, obtaining a first set of prospects on whether the files are malware or not, extracting raw binary data from said each file, converting the raw binary data into an image representing said raw binary data, building a second set of vectors based on each image, feeding the second set of vectors to the deep learning algorithm, obtaining a second set of prospects on whether the files constitutes malware or not, and updating a neural network used by the scoring module, based on at least the first set of prospects and the second set of prospects, for training the scoring module to provide a decision of whether a file constitutes malware or not.

In accordance with some aspects of the presently disclosed subject matter, there is provided a non-transitory storage device readable by a machine, tangibly embodying a program of instructions executable by the machine to perform a method for detecting malware, comprising extracting features from a file based on features present in at least a dictionary, building a vector based on the extracted features, feeding the vector to a malware detector comprising a deep learning algorithm, and determining the prospects of whether said file constitutes malware or not.

In accordance with some aspects of the presently disclosed subject matter, there is provided a non-transitory storage device readable by a machine, tangibly embodying a program of instructions executable by the machine to perform a method for detecting malware, comprising extracting features of a file operating on a given operating system, based on features present in a dictionary and being independent of said operating system, building a vector based on the extracted features, feeding the vector to a malware detector comprising a deep learning algorithm, and determining the prospects of whether said file constitutes malware or not.

In accordance with some aspects of the presently disclosed subject matter, there is provided a non-transitory storage device readable by a machine, tangibly embodying a program of instructions executable by the machine to perform a method for detecting malware, comprising extracting first features from a file based on features present in a first dictionary, building a vector based on the first features, feeding the vector to the deep learning algorithm, for providing first prospects on whether the file constitutes malware or not, extracting second features from the file based on features present in a second dictionary which is different from the first dictionary, building a vector based on the second features, feeding the vector to the deep learning algorithm, for providing second prospects on whether the file constitutes malware or not, providing a result on whether the file constitutes malware or not, based on at least the first and second prospects.

In accordance with some aspects of the presently disclosed subject matter, there is provided a non-transitory storage device readable by a machine, tangibly embodying a program of instructions executable by the machine to perform a method for detecting malware by a malware detector comprising a deep learning algorithm, comprising extracting first features from a file based on features present in a first dictionary, building at least a vector based on the first features, feeding the vector to the deep learning algorithm, for providing first prospects on whether the file constitutes malware or not, extracting raw binary data from said file, converting the raw binary data into an image representing said raw binary data, building a second vector based on the image, feeding the second vector to the deep learning algorithm, for obtaining a second prospect on whether the file constitutes malware or not, and providing a binary result on whether the file constitutes malware or not, based on at least the first and second prospects.

According to embodiments of the invention, the malware detection does not rely on a signature-based detection, such as the signature-based detection described with reference to FIGS. 1 and 2.

According to certain embodiments of the invention, detection of new malware is achieved even if the malware detector has never encountered previously said new malware.

According to certain embodiments of the invention, the same malware detector may scan files which are operable on different operating systems, or files which are of different types.

According to certain embodiments of the invention, the detection of new malware is achieved even if the user of the malware detector cannot access a network for a certain period of time. The malware detector may thus operate "offline" for a certain period of time. To the contrary, some prior art malware detectors cannot correctly detect new malware as soon as one update of the database was missed by the user, said updates occurring generally two to three times a day.

According to certain embodiments of the invention, the malware detector is trained by processing a large amount of malware and non malware files, and the malware detector is able to process, in real time, each file.

According to certain embodiments of the invention, the malware detector is configured to detect that a file is a malware in real time. A real time detection may include a detection which does not affect the user's experience of the system.

According to certain embodiments of the invention, the malware detector is configured to prevent the user's system from a threat of a malware in real time. A real time prevention may include a prevention which does not affect the user's experience of the system.

According to certain embodiments of the invention, the malware detector is able to provide prospects that a file constitutes malware, said prospects comprising at least a probability and/or a binary result.

According to certain embodiments of the invention, the malware detector is able to provide several prospects of whether a file constitutes malware or not, and to combine these prospects in order to provide a binary decision and/or aggregated prospects of whether the file constitutes malware or not.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 23 illustrates an embodiment of a vector obtained by the method of FIG. 22;

FIGS. 24A and 24B illustrate examples of vectors obtained with the method of FIG. 22;

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification discussions utilizing terms such as "processing", "comparing", "updating", "building", "extracting", "converting" or the like, refer to the action(s) and/or process(es) of a processor that manipulate and/or transform data into other data, said data represented as physical, such as electronic, quantities and/or said data representing the physical objects.

The term "processor" covers any computing unit or electronic unit that may perform tasks based on instructions stored in a memory, such as a computer, a server, a laptop, a smartphone, a chip, etc. It encompasses a single processor or multiple processors, which may be located in the same geographical zone or may, at least partially, be located in different zones and may be able to communicate together.

Embodiments of the presently disclosed subject matter are not described with reference to any particular programming language. It will be appreciated that a variety of programming languages may be used to implement the teachings of the presently disclosed subject matter as described herein.

In the present description, the expression "malware" may include any form of malicious activity such as malware, cyber threat, etc.

It is to be understood that the expression "files", such as "malware files" or "non malware files", may include computer files, but also malicious and non malicious activities which may be performed on a system without using a file such as process memory, snapshot of process memory, e.g. memory dump.

Figure 1:
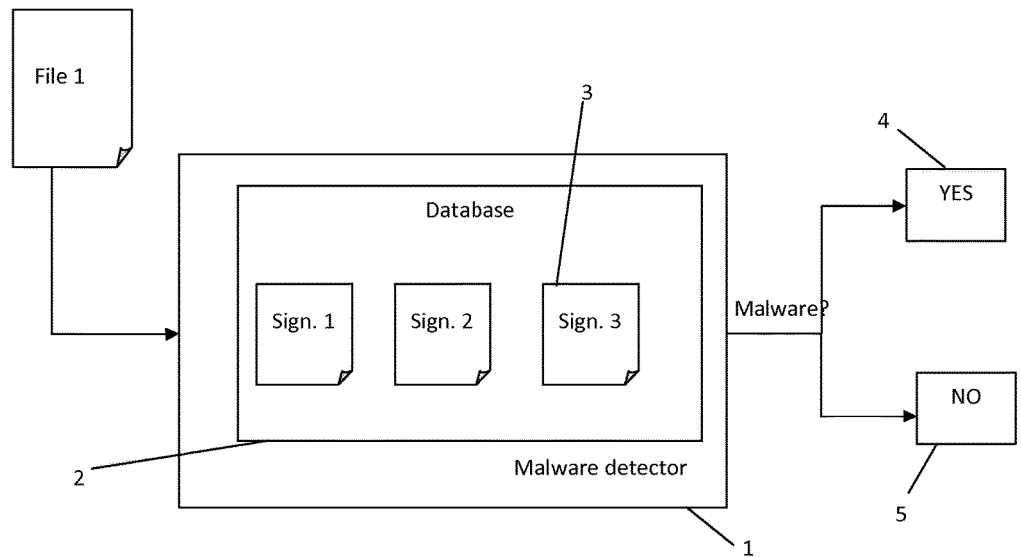
FIG. 1 illustrates a functional block diagram of a malware detector according to a prior art solution.
Figure 2:
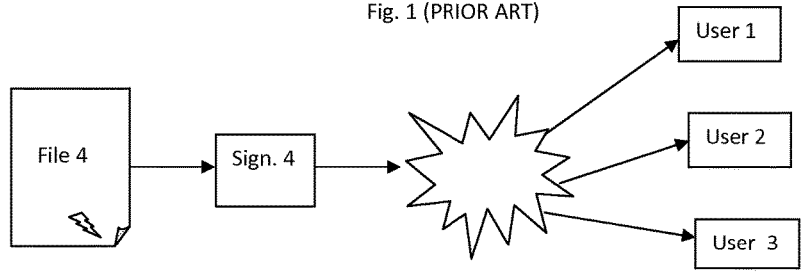
FIG. 2 illustrates an example of the update of the prior art malware detector of FIG. 1, after it appears that the malware detector fails to detect a new malware.
Figure 3:
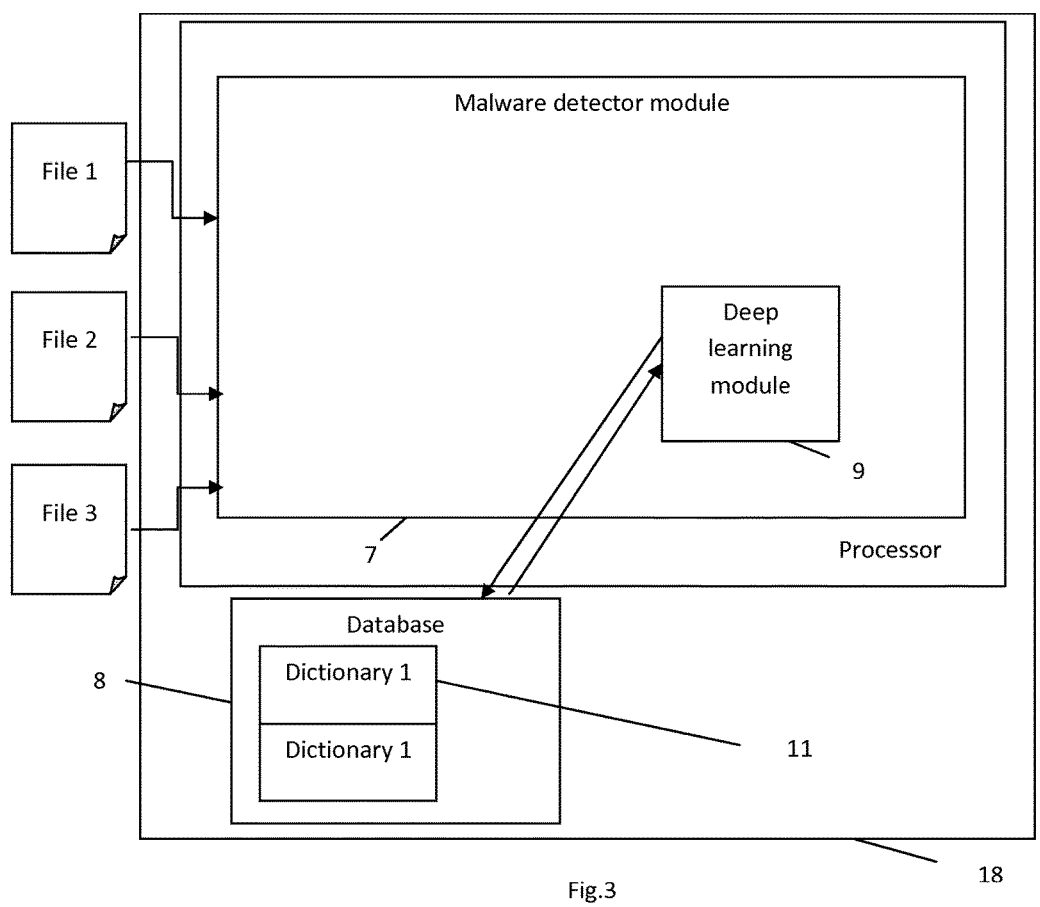
FIG. 3 illustrates a functional block diagram of an embodiment of a system for malware detection according to the invention.

FIG. 3 describes a system 18 for malware detection according to one embodiment of the invention comprising a malware detector module 7. The malware detector module 7 is operable on a processor.

The malware detector module 7 comprises a deep learning module 9 which may run at least a deep learning algorithm. Deep learning is a branch of machine learning based on a set of algorithms that attempt to model high-level abstractions in data by using multiple processing layers with complex structures or otherwise, composed of multiple non-linear transformations.

Deep learning algorithms are known per se. They may be implemented in several ways, such as Deep neural networks, Deep belief networks, Convolutional neural networks, Convolutional Deep Belief Networks, Stacked (Denoising) Auto-Encoders, Deep stacking networks, Deep Recurrent Neural Networks.

Various articles describe the principles of deep learning algorithms, such as: Deng, L., Yu, D. (2014) "*Deep Learning: Methods and Applications*" Foundations and Trends in Signal Processing 7: 3-4., Bengio, Yoshua (2009), "*Learning Deep Architectures for AI*", Foundations and Trends in Machine Learning 2 (1): 1-127, Yann LeCun, Yoshua Bengio, & Geoffrey Hinton, Deep Learning, Nature 521, 436-444, 2015, and Wikipedia, https://en.wikipedia.org/wiki.Deep_learning. These documents are incorporated herein by reference.

The system for malware detection may comprise a database 8. It is to be noted that the database is not necessarily geographically located in the system and may be located in another system which communicates with the system for malware detection, for instance through a network. It may also encompass a single database as well as a plurality of databases, which may be located in the same geographical zone or at least partially in different geographical zones.

This database 8 may store at least one dictionary 11, which will be described further in the specification. This dictionary 11 is used to convert the files that are to be fed to the deep learning algorithm, in order to determine the prospects of whether said files constitute malware or not.

Figure 4:
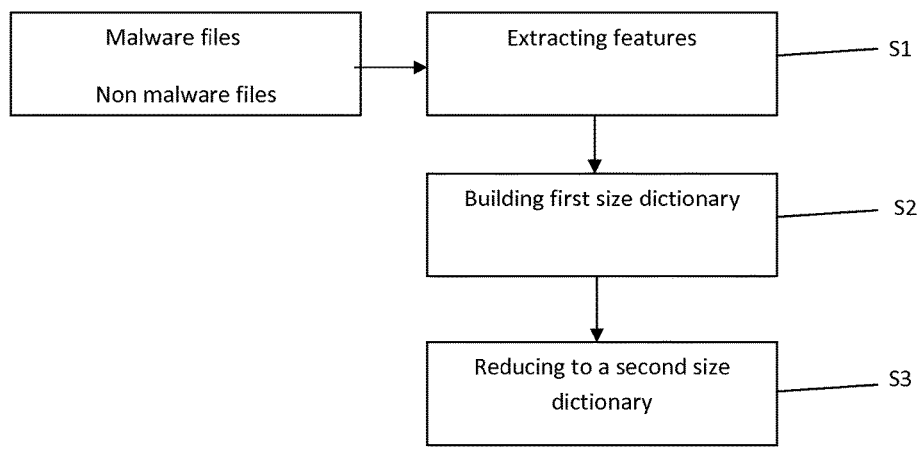
FIG. 4 illustrates a generalized flow-chart of an embodiment of a method for building a dictionary, for adapting files to the input of a malware detector comprising a deep learning algorithm.
Figure 5:
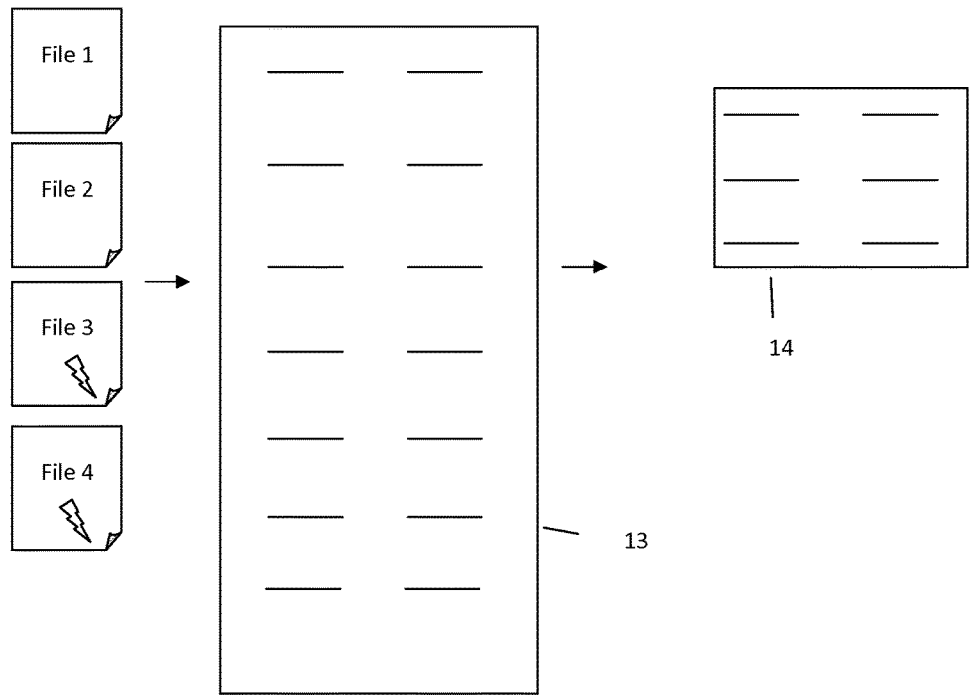
FIG. 5 illustrates an embodiment of a method for reducing the size of a first size dictionary, in order to obtain a second size dictionary, for adapting files to the input of a malware detector comprising a deep learning algorithm.

FIG. 4 and FIG. 5 describe a possible embodiment of a method for building a dictionary, for adapting files to the input of a malware detector comprising a deep learning algorithm, in order to determine the prospects of the files to be malware.

A plurality of malware files and non malware files are fed to a system for malware detection, and in particular to a malware detector module. For each file, it is known if this file is a malware file (see e.g. File 3 and File 4 in FIG. 5) or a non malware file (see e.g. File 1 and File 2 in FIG. 5)

Malware files and non malware files can encompass various types of files, such as software, images, texts, data, portable executable files, webpage, etc. According to certain embodiments, they are operable on various operating systems. According to certain embodiments, they are operable on different computing units (computer, server, Smartphone, etc.).

For instance, thousands or millions of malware files and non malware files may be used. These numbers are non-limiting examples.

Features are extracted from each of the plurality of malware and non malware files (step S1 in FIG. 4), or at least from a portion of the plurality of malware files and non malware files, in order to build a first size dictionary. These features are for instance chosen because they provide a representation of the files or provide information on said files. Various embodiments and examples will be provided in the specification for these features.

Such extraction may be performed by analyzing the content of the plurality of malware and non malware files, or at least part of said content. The content to be analyzed depends on the location of these features, and this content comprises for instance a header, a payload of the file, a source code, a portion of a memory, etc.

Alternately, or additionally, the features present in the plurality of malware and non malware files are already known, and the extraction is a mere choice of features among these known features present in the files. This choice may encompass selecting all known features present in the files, or at least part of said features. A non-limiting example will be provided with reference to FIG. 13.

The extracted features are then stored into a first size dictionary 13 (step S2 in FIG. 4). The first size dictionary 13 may be stored in any adapted database. The first size dictionary 13 may be a matrix or vector storing all extracted features from all malware files and non malware files that were fed to an extraction module performing the extraction. The extracted features may be stored as such or as values representing said features. If some features appear several times, they may be stored once with an associated variable counting the occurrence of each feature in the set of files. In particular, the occurrence in the malware files and the occurrence in the non malware files may be stored.

In one embodiment, each feature is extracted separately from the content of the malware files and non malware files. For instance, if a file comprises features $F_1$ to $F_N$, features $F_1$ to $F_N$ are extracted and stored in the first size dictionary.

In another embodiment, the features are extracted by groups of features. In this case, a first group may be [F1; F2], a second group [F3; F4], etc. The features may for instance be grouped in different groups, each group comprising "n" successive features as they appear in the files. Thus, the first size dictionary stores these different groups of "n" features.

For instance, a known per se n-gram algorithm is used. In a non limiting example, n is chosen between 2 and 5.

The extraction of the features from the malware files and non malware files, and the building of the first size dictionary may be performed by an extraction module (not represented in the Figures). This extraction module may be operable on a processor. It may be part of the malware detector module 7 but this is not mandatory. In one embodiment, part of the extraction module is operable on a first processor, and part of the extraction module is operable on the malware detector module 7. In this case, the first processor is able to communicate data with the processor on which the malware detector module 7 is operable. In this embodiment, part of the extraction may be performed by the part of the extraction module located in the first processor, and the other part of the extraction may be performed by the other part of the extraction module located in the malware detector module 7.

Figure 20:
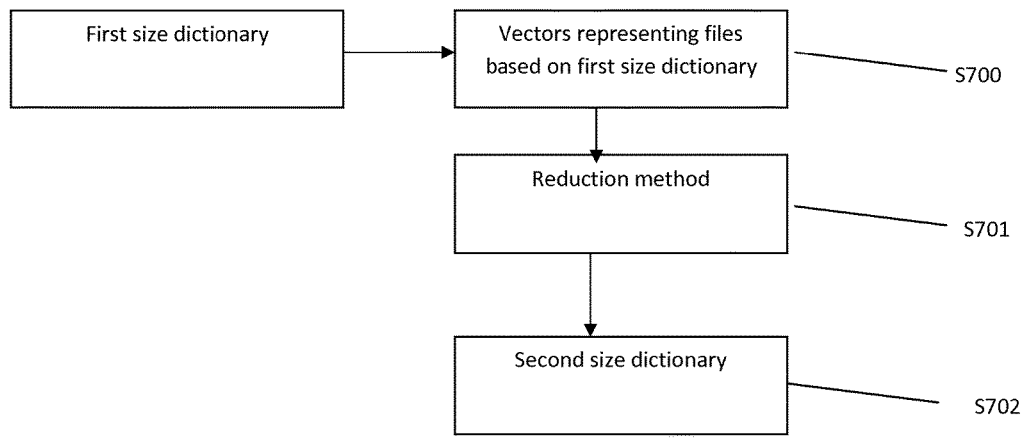
FIG. 20 illustrates a flow-chart of an embodiment of a method for reducing the size of the first size dictionary.
Figure 21:
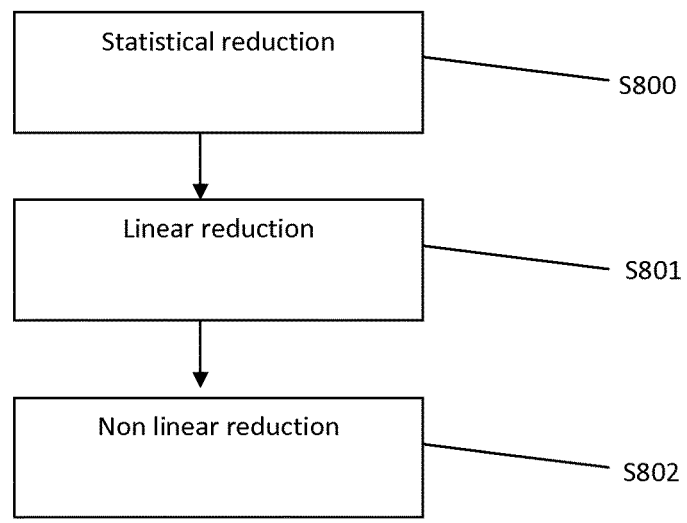
FIG. 21 illustrates an example of a sequence of different reduction algorithms for reducing the first size dictionary.

The size of the first size dictionary 13 is then reduced by selecting a subset of features in said first dictionary 13 (see e.g. step S3 in FIG. 4). This reduction is performed by using one or more reduction algorithms Examples of reduction algorithms will be described later in the specification, in reference e.g. to FIGS. 19 to 21.

The reduction of the first size dictionary 13 results in a second size dictionary 14 of a lower size (see e.g. FIG. 5). In one example, the total size of the first size dictionary is about 4 GB, and the total size of the second size dictionary is around 100 KB. These numbers are non limiting examples.

The reduction of the first size dictionary 13 into a second size dictionary 14 of a lower size may be performed by a reduction module (not represented in the Figures). This reduction module may be operable on a processor. It may be part of the malware detector module 7 but this is not mandatory. In one embodiment, part of the reduction module is operable on a first processor, and part of the reduction module is operable on the malware detector module 7. In this case, the first processor is able to communicate data with the processor on which the malware detector module 7 is operable. In this embodiment, part of the reduction may be performed by the part of the reduction module located in the first processor, and the other part of the reduction may be performed by the other part of the reduction module located in the malware detector module 7.

As explained below, the second size dictionary 14 is used to build vectors representing each file (see e.g. FIGS. 22 to 24). As a consequence, it dictates, for a file to be fed to the system for malware detection, the size and the content of a vector representing said file and suitable for being processed by the deep learning algorithm, for determining the prospects of whether said file constitutes malware or not.

Figure 6:
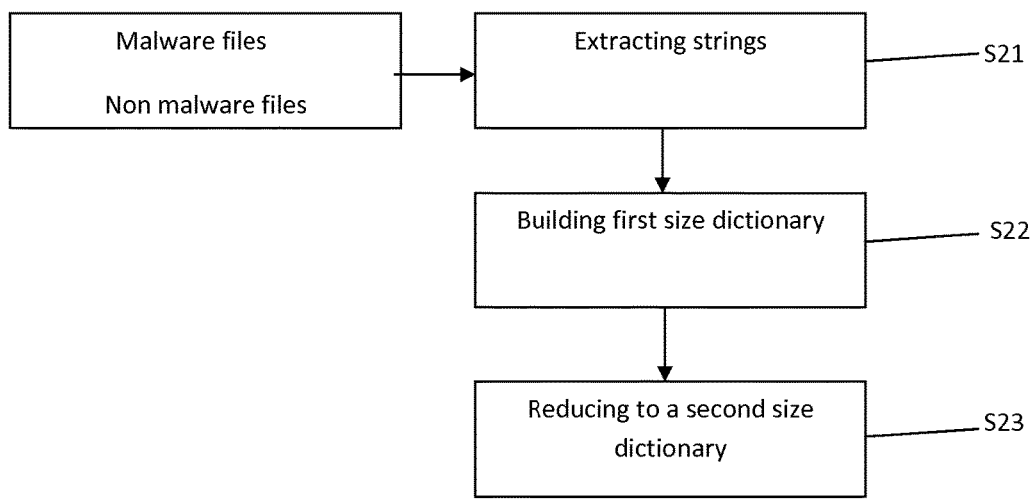
FIG. 6 illustrates an example of a method for reducing the size of a first size dictionary, in order to obtain a second size dictionary, for adapting files to the input of a malware detector comprising a deep learning algorithm.

As illustrated in FIG. 6, in one possible embodiment, the features comprise strings. A highly simplified and non limiting example is provided in FIG. 8.

The first size dictionary is built by extracting strings present in the content of the plurality of malware files and non malware files (step S21). The content of the file from which the strings are extracted depends on the type of the file. For instance, for a text file, the content comprises the textual information present in the file. In an executable file, the content of the file may for example be chosen as its source code.

Strings may be defined as any group of textual characters, the groups being separated by a space. In this case, all strings (or at least a subset) of all malware files and non malware files are extracted and stored in the first size dictionary (step S22).

Figure 7:
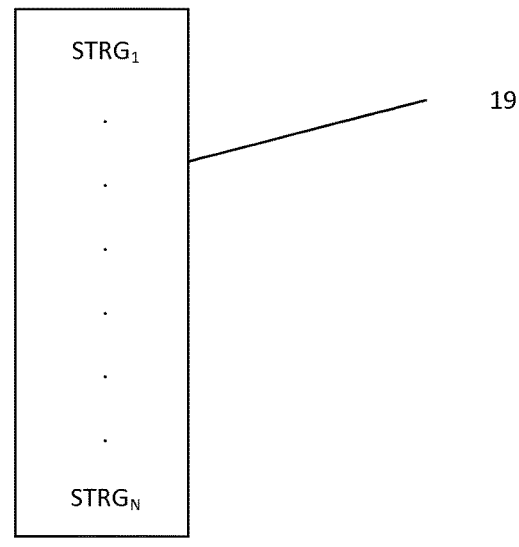
FIG. 7 illustrates an example of first size dictionary wherein the features extracted from the files are strings.

For instance, if strings $STRG_1$ to $STRG_N$ are present in the set of malware files and non malware files, the first size dictionary 19 (see FIG. 7) may comprise strings $STRG_1$ to $STRG_N$. Each string may be stored in the first size dictionary with a variable indicating its occurrence in the set of files, and in particular, its occurrence in the set of malware files and its occurrence in the set of non malware files.

As already mentioned with respect to FIG. 4, at least a reduction method is then applied to select strings from the first size dictionary to result in a second size dictionary of a lower size, comprising a subset of selected strings.

The first size dictionary and the second size dictionary are thus string-based dictionaries. The second size dictionary is configured to define the size and the content of a vector representing a file to be fed to the deep learning algorithm for determining whether the file constitutes malware or not.

Figure 8:
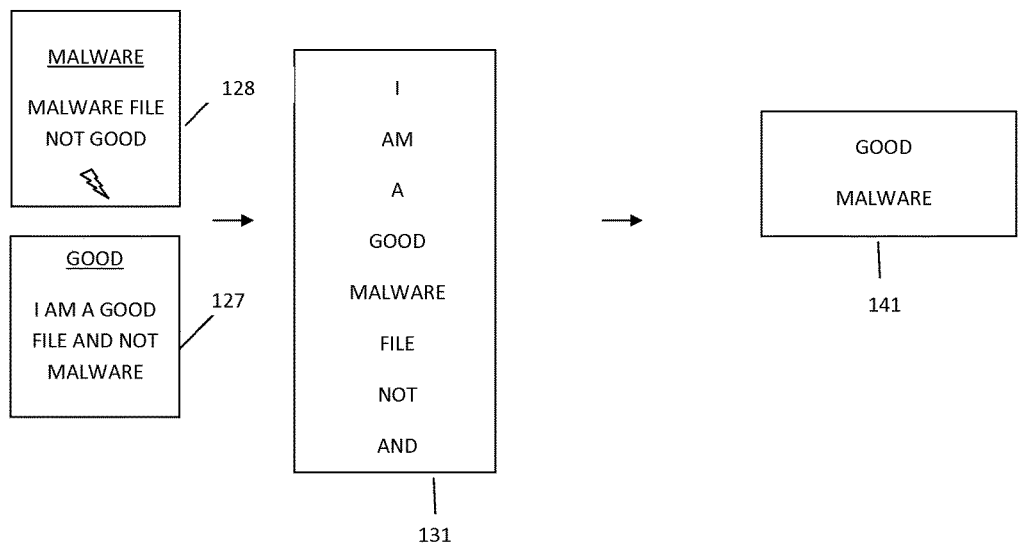
FIG. 8 illustrates a non limiting example of building a second size dictionary wherein the features extracted from the files are strings.

A highly simplified and non limiting example is provided in FIG. 8, which illustrates the building of a first size dictionary and second size dictionary, when the features are strings. File 127 is a malware file, and file 128 is a non malware file. The text content of each file is illustrated in FIG. 8.

As depicted, all strings from all files 127, 128 are extracted to provide a first size dictionary 131. After reduction of the first size dictionary 131 by applying at least a reduction method described later, for instance to the content of the first size dictionary 131, a second size dictionary 141 with a reduced number of strings is obtained. This example is only for the purpose of illustration and the selected features in the second size dictionary may be different.

A file that has to be fed to the deep learning algorithm of the malware detector may then be converted by using the second size dictionary 141. This conversion will be explained later with reference e.g. to FIG. 22.

As already mentioned, the strings may be extracted from the files by groups of strings. An extraction method may comprise an n-gram algorithm.

According to some embodiments, the first size dictionary may also store the occurrence of each string in the corpus of malware files, and the occurrence of each string in the corpus of the non malware files.

In another possible embodiment (see e.g. FIG. 9), which may be combined with the previous one, the features comprise operating codes of the malware files and non malware files.

In computing, an opcode (abbreviated from operation code) is the portion of a machine language instruction that specifies the operation to be performed. Examples of opcodes are functions such as "jump", "add", "move", etc. These opcodes may be found in the assembler code of the file, which is a low level of programming.

Figure 9:
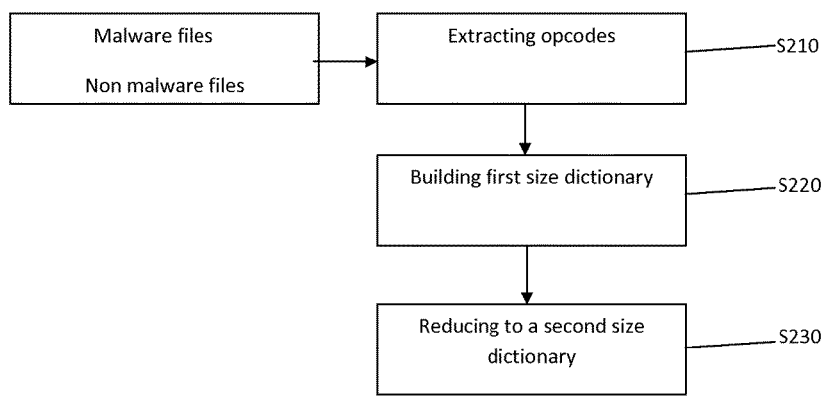
FIG. 9 illustrates a flow-chart of an embodiment of a method for building a dictionary based on opcodes present in the files, for adapting files to the input of a malware detector comprising a deep learning algorithm.

As illustrated in FIG. 9, operating codes (step S210) are extracted from the plurality of malware files and non malware files.

The extracted opcodes are used to build the first size dictionary (step S220 in FIG. 9). Similarly to what was described for FIG. 7 where the features are strings, the opcodes may be stored each once in the first size dictionary and may be stored with an occurrence for each opcode. In particular, the occurrence in the malware files and the occurrence in the non malware files may be stored.

A selection of a subset of opcodes in the first size dictionary provides the second size dictionary with a lower size. This selection of a subset of opcodes is performed by using at least a reduction method described later (see e.g. FIGS. 19 to 21).

The opcodes may be extracted each individually or as groups of opcodes. Accordingly a known per se n-gram algorithm may be used to extract the opcodes, in order to reduce the size of the first size dictionary.

Figure 10:
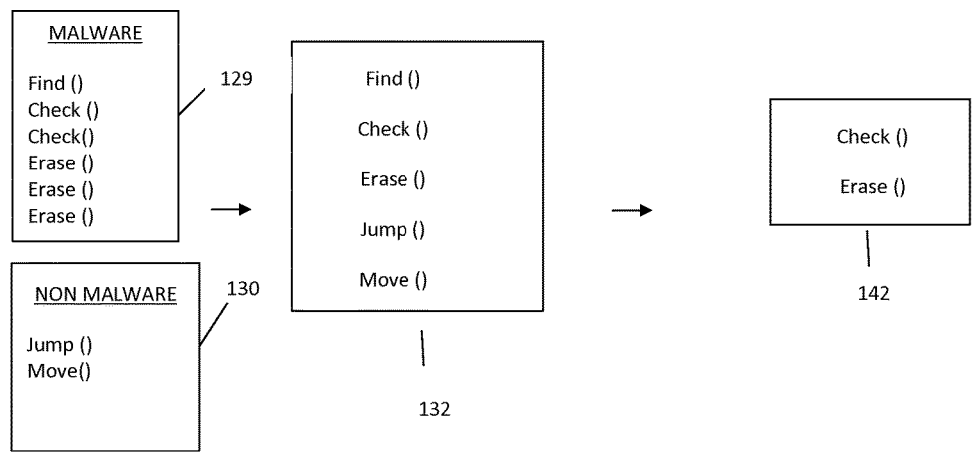
FIG. 10 illustrates a non limiting example of building a second size dictionary wherein the features extracted from the files are opcodes.

A highly simplified and non limiting example is provided in FIG. 10, which illustrates the building of a first size dictionary and second size dictionary, when the features are strings. File 129 is a malware file, and file 130 is a non malware file. The opcodes of each file are illustrated in FIG. 8.

All opcodes ("Find ( ) Check ( ) Erase ( ) Jump ( ) Move ( )") from the files 129, 130 are extracted to provide a first size dictionary 132. After reduction of the first size dictionary 132 by applying at least a reduction method, for instance to the content of the first size dictionary, a second size dictionary 142 with a reduced number of opcodes is obtained ("Check( )" and "Erase( )").

Figure 11:
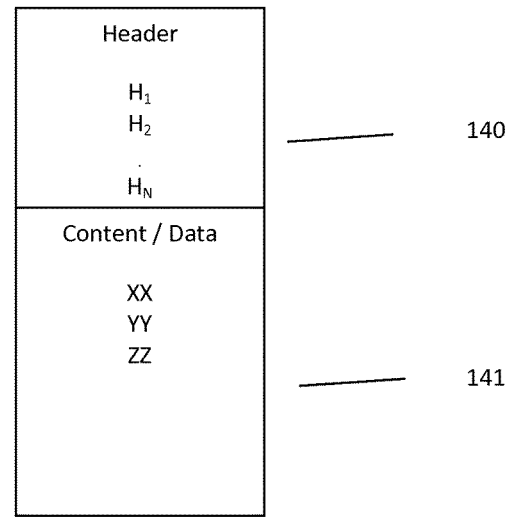
FIG. 11 illustrates an exemplary structure of some files that may be fed to the malware detector.
Figure 12:
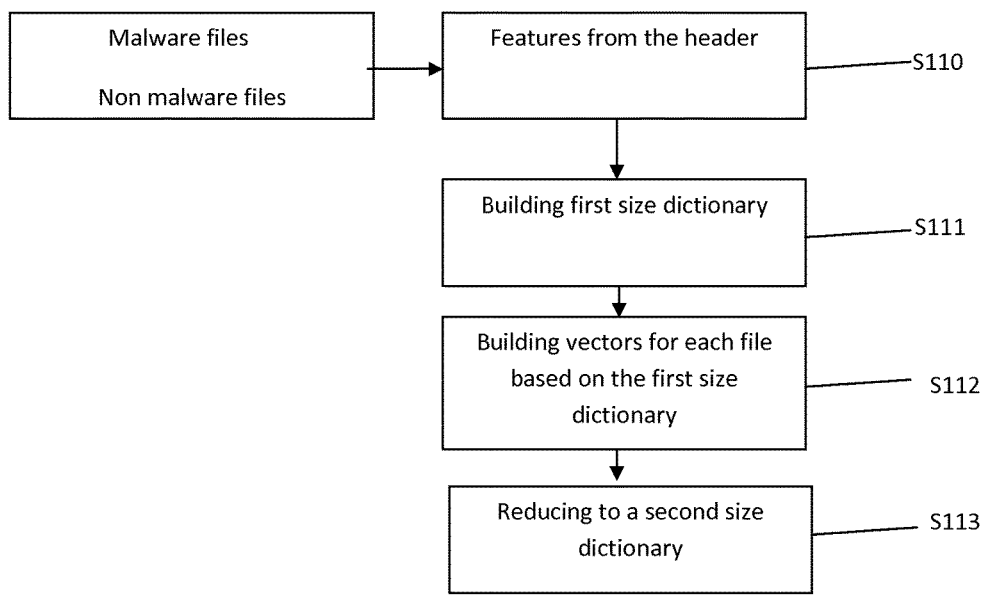
FIG. 12 illustrates a flow-chart of an embodiment of a method for building a dictionary based on features present in the header of the files, for adapting files to the input of a malware detector comprising a deep learning algorithm.
Figure 13:
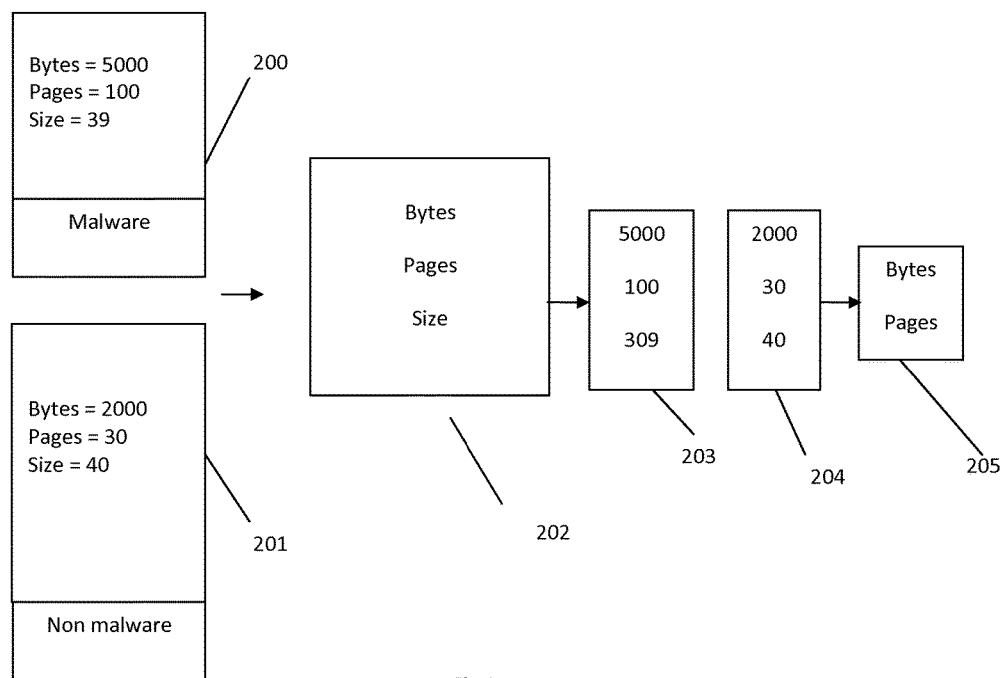
FIG. 13 illustrates a non limiting example of building a second size dictionary based on features present in the header of the files.

With reference to FIG. 11 to FIG. 13, another embodiment is now described, wherein the features used to build the first size dictionary comprise features present in a header of the malware files and non malware files. FIG. 13 illustrates a highly simplified and non limiting example when the features are part of the header.

As illustrated in FIG. 11, some files comprise the following structure: a data part 140, also called content or payload, and a header part 141, comprising features $H_1$ to $H_N$. This is the case for example for portable executable files, such as .EXE or .DLL files.

The header provides various information on the file, and comprises for instance the following features: bytes on last page of the file, number of pages in the file, size of header in paragraphs, relocations, magic number, etc.

A large number of other information may be stored in the header of the file, depending on the nature of the file and the operating system of the file.

A possible embodiment is now described, for building the first size dictionary based on the features $H_1$ to $H_N$ present in the header 140 of the file. The first size dictionary may be built according to steps S110 and S111 of FIG. 12.

In one embodiment, the features $H_1$ to $H_N$ are already known (for instance from the definition of the files). For instance, it is known that the header comprises the bytes on last page of the file (which may be thus defined as the first feature $H_1$), the number of pages in the file (which may thus be defined as the second feature $H_2$), etc.

Thus, the building of the first dictionary is a mere choice of features among these known features present in the header (of course the whole set of features $H_1$ to $H_N$ may also be chosen).

If the features present in the header are not known, they may be deduced from the file, for instance by reverse engineering of the files. If some files or all files of the set of malware files and non malware files are of the same type (for instance because they all are .EXE files, this example being non-limiting), it is not necessary to perform an analysis of the header of all files to identify the features present in the header, since the header of these files comprise the same features.

A first size dictionary is thus obtained, which comprises the features of the header of the files.

Then, for each file of the malware files and non malware files, the values of the features $H_1$ to $H_N$ stored in the first size dictionary are read from the header of said file (step S112, see also FIG. 13 for a non-limiting example). It is to be noted that a given feature may have a plurality of values or a range of values in a given file.

A vector comprising said values is built for each file (see vectors 23 and 27 in FIG. 13 for a non-limiting example). A complete set of vectors is thus obtained, each vector representing a file based on the features present in the first size dictionary.

A reduction method is applied to this set of vectors. A description of embodiments for this reduction method will follow (see e.g. FIGS. 19 to 21). One output of this reduction method is a list of subset of features $H_1$ to $H_n$ (n<N). The second size dictionary comprises this subset of features $H_1$ to $H_n$ (step S113 in FIG. 12).

Referring to the non limiting example of FIG. 13, the header of the malware file 200 and the non malware file 201 comprises features "Bytes on last page of the file" (represented as "Bytes" only in FIG. 13), "Number of pages in the file" (represented as "Pages" only in FIG. 13) and "Size of header in paragraphs (represented as "Size" only in FIG. 13).

As shown in FIG. 13, the first size dictionary 202 is built based on these features.

Vectors 203 and 204 are built based on said first size dictionary 135 by reading, respectively in the header of each file 200 and 201, the value of each feature present in the first size dictionary 135. A reduction method is applied to vectors 203 and 204, whose output provides that the features "Bytes" and "Pages" are to be selected. Thus, the second size dictionary 143 comprises features "Bytes" and "Pages". This example is only for the purpose of illustration and the selected features in the second size dictionary may be different.

According to some embodiments, the features that are stored in the first size dictionary comprise features present in the header, and/or statistical features characterizing the file. The statistical features may be values that may be read from the file itself (not necessarily in the header) or values that need to be computed from the file.

Examples of statistical features include: "File size", "Entropy" (information on the file), "Version" (version of the file), "Certificates" (certificates used by the file), "Strings" (number of strings in the file), DOS structure of the file. Many other different statistical features may be used.

Figure 13A:
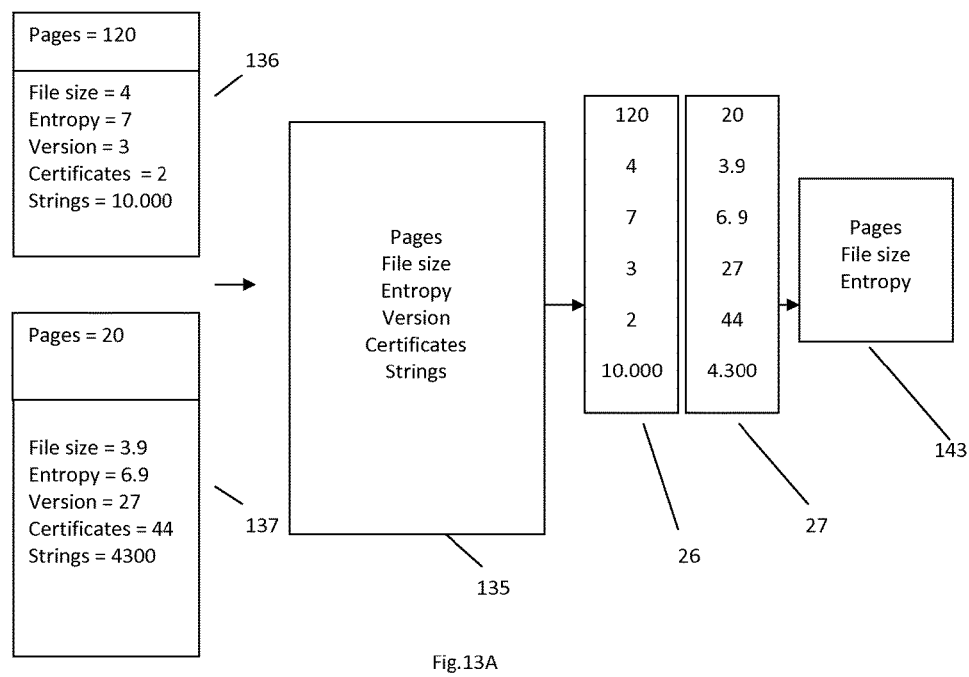
FIG. 13A illustrates a non limiting example of building a second size dictionary based on features present in the header of the files, and on statistical features representing the file.
Figure 14:
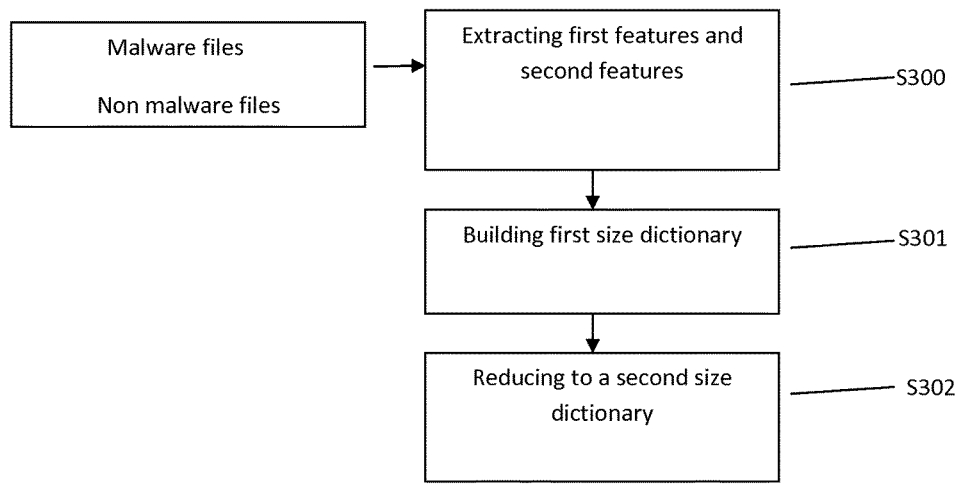
FIG. 14 illustrates an embodiment of the construction of a first size dictionary based on first features and second features present in the files.

A highly simplified and non limiting example is provided in FIG. 13A, wherein the features used for building the first size dictionary and second size dictionary are features present in the header of the file and statistical features of the file (not necessarily present in the header).

In this example, file 136 constitutes malware, and file 137 constitutes non malware file. The header of the files comprises only "Pages" (number of pages of the file). Statistical features representing the files comprise "File size", "Entropy", "Version", "Certificates", "Strings".

As shown in FIG. 13, the first size dictionary 135 is built based on these features.

Vectors 26 and 27 are built based on said first size dictionary 135, by storing in each vector the values of the features in the file.

As mentioned these values may be read from the file or in some cases may be computed from the file. A reduction method is applied to vectors 26 and 27, whose output provides that the features "Pages", "File size" and "Entropy" are to be selected. Thus, the second size dictionary 143 comprises features "Pages", "File size", and "Entropy". This example is only for the purpose of illustration and the selected features in the second size dictionary may be different.

According to some embodiments, the features of the header and/or the statistical features of the file may be stored each individually in the first size dictionary (as illustrated in FIGS. 13 and 13A) or as groups of features.

Various embodiments have been described for building the first size dictionary and the second size dictionary, based on features present in the file.

It has to be noted that according to some embodiments, a plurality of different sets of features is used to build the first size dictionary and the second size dictionary.

In particular, in one embodiment (see e.g. FIG. 14 to FIG. 17), the first size dictionary is built from at least a first set of features and at least a second set of features, which is different from the first set of features. This applies to more than two sets of different features.

In one embodiment, at least first features and second features (which differ from the first one) are extracted from the malware files and non malware files (step S300). A first size dictionary, comprising the first features and second features, is built. Then, at least a reduction method is applied to the first size dictionary, in order to obtain a second size dictionary comprising a subset of features among the first features and second features (steps S301 and S302).

Figure 15:
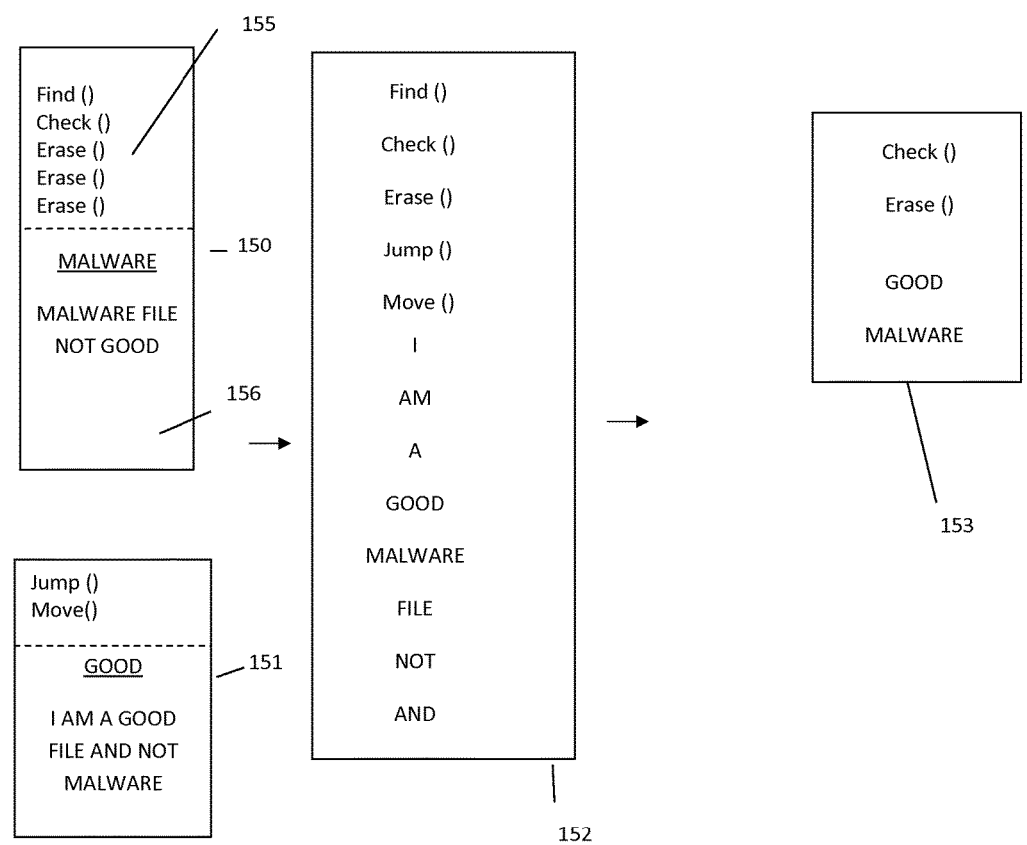
FIG. 15 illustrates a non limiting example of building a second size dictionary based on strings and opcodes of the files.

A simplified and non limiting example is provided in FIG. 15. Each file (malware file 150 and non malware file 151) comprises opcodes 155 and strings 156. The opcodes and strings present in the files are extracted to build the first size dictionary 152. At least a reduction method is used to reduce the first size dictionary 152 in order to obtain the second size dictionary 153, in which the features "Check ( )", "Erase ( )", "GOOD", "MALWARE" are stored. This example is only for the purpose of illustration and the selected features in the second size dictionary may differ.

Figure 16:
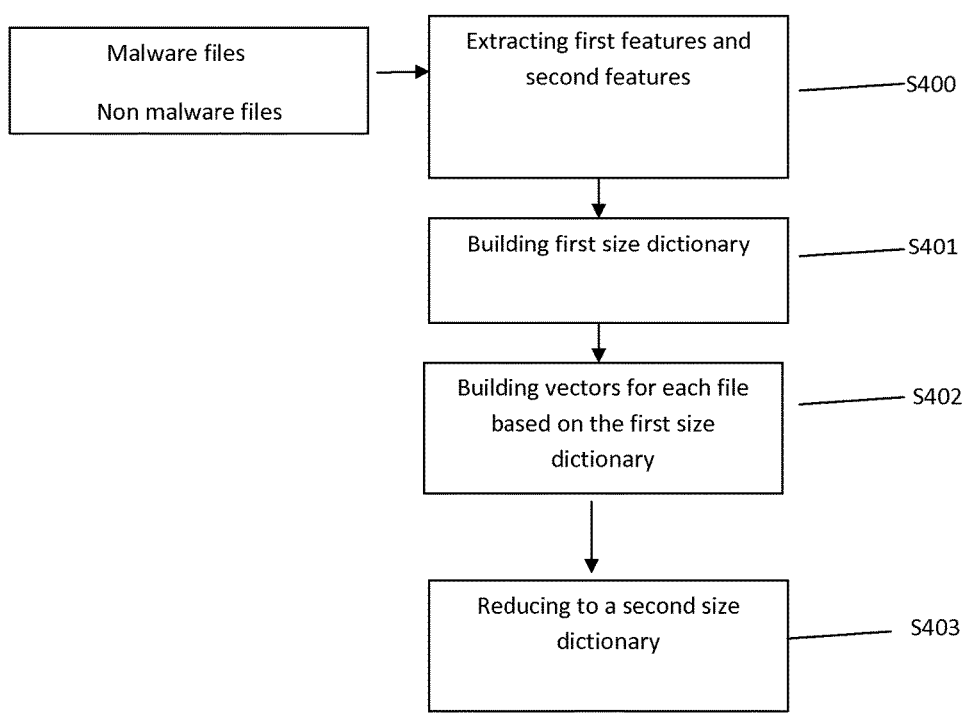
FIG. 16 illustrates an embodiment of the construction of a first size dictionary based on first features and second features present in the files, and its reduction into a second size dictionary.

According to some embodiments, and as depicted in FIG. 16, at least first features and second features (different from the first one) are extracted from the malware files and non malware files (step S400). A first size dictionary, comprising the first features and second features, is built (step S401). Then, vectors representing each file of the malware files and non malware files based on features stored in the first size dictionary are built (step S402—this step being further described with reference to FIG. 20). At least a reduction method is applied to these vectors in order to obtain a second size dictionary comprising a subset of features among the first features and second features (step S403).

Figure 17:
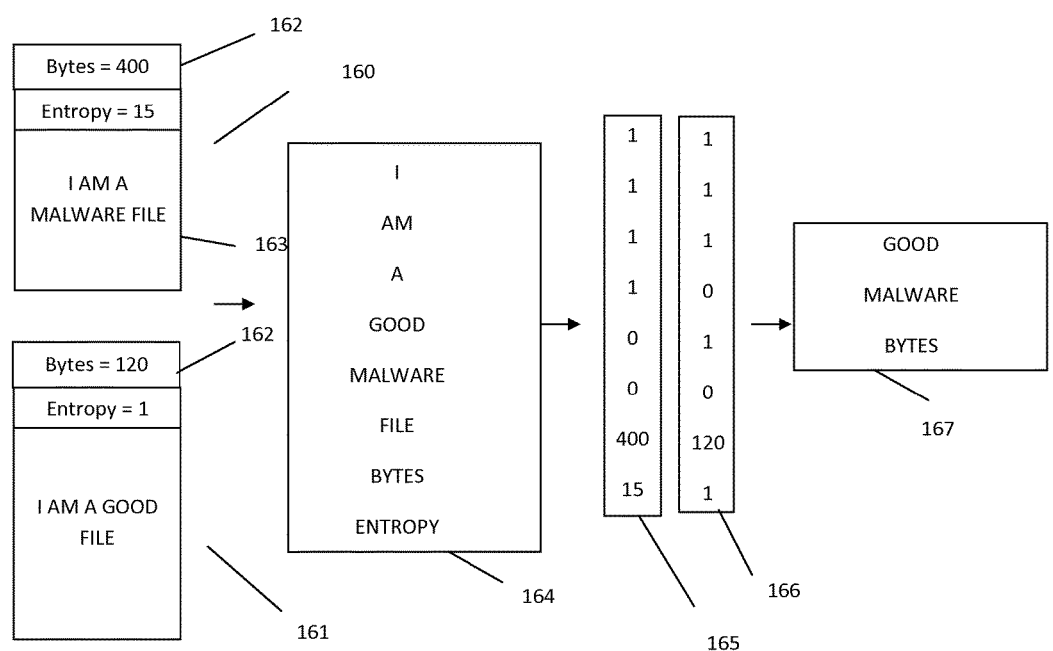
FIG. 17 illustrates a non limiting example of building a second size dictionary based on strings of the files, features of the header of the files and statistical features representing the files.

A simplified and non limiting example is provided in FIG. 17, which illustrates malware file 160 and non malware file 161. In this example, three different features are used. The first features are strings, present in the payload 163 of the files, the second features comprise a part of the header 162 ("Bytes"), and the third features comprises statistical features ("Entropy"), which have to be computed from the files.

A first size dictionary 164 is built by extracting the features present in the files. This extraction step has already been described with reference to e.g. FIGS. 6 and 12. In this case, this extraction is a mere selection of the features to be stored in the first size dictionary.

Vectors 165 and 166 are built for each file 160, 161 based on the features present in the first size dictionary 164.

For the strings, if a string listed in the first size dictionary 164 is present in the file, a first value is provided (here 1), and if a string listed in the first size dictionary is not present, a second value is provided (here 0).

For the part of the header ("Bytes"), the corresponding value is read in each file and stored in the corresponding vector.

For the statistical feature ("Entropy"), this value may be calculated from each file.

At least a reduction method is applied to vectors 165 and 166. This reduction method provides that the features "GOOD", "MALWARE" and "Bytes" may be selected as a subset of the features present in the first size dictionary 164. The second size dictionary 167 is thus obtained and comprises this subset of features. This example is only for the purpose of illustration and the selected features in the second size dictionary may be different.

Although particular examples have been described with reference to FIG. 15 and FIG. 17 for the first features and second features, many different combinations of different features may be performed to build the first size dictionary and the second size dictionary, or a greater number of dictionaries.

In an embodiment, the features comprise strings present in the content of the malware files and non malware files, and operating codes of the malware files and non malware files. This combination of features is used to build the first size dictionary and the second size dictionary, as explained with reference to FIGS. 14 to 17.

In another embodiment, the features comprise features present in a header of the malware files and non malware files, and operating codes of malware files and non malware files. This combination of features is used to build the first size dictionary and the second size dictionary, as explained with reference to FIGS. 14 to 17.

In another embodiment, the features comprise features present in a header of the malware files and non malware files, and strings present in the content of the malware files and non malware files. This combination of features is used to build the first size dictionary and the second size dictionary, as explained with reference to FIGS. 14 to 17.

The features may also comprise more than two different sets of features, with any combination of different features.

Figure 18:
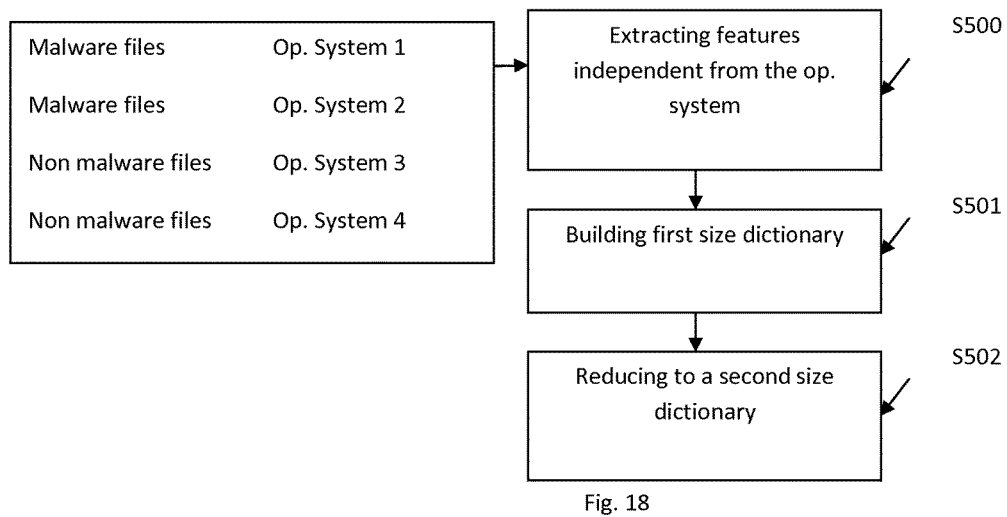
FIG. 18 illustrates an embodiment of a method for building a first size dictionary and second size dictionary based on files operable on different operating systems.

With reference to FIG. 18, the building of a first size dictionary and second size dictionary are now described according to some embodiments in which the malware files and non malware files are operable on different operating systems. For instance, some files are operable on Windows™ operating system, whereas some files are operable on Apple™ operating system. This applies to other operating system and to a greater number of operating systems.

It is advantageous to use features that are independent from the operating systems so that the first size dictionary and the second size dictionary are built irrespective of the operating systems (step S501).

In other words, the dictionaries may be built although the files come from different sources and behave in different ways due to their different operating systems. This provides a high flexibility for building the dictionaries. For instance, the features "strings" are independent of the operating system. The same applies to the "opcodes" feature and to the conversion of each file into an image, as described with reference to FIG. 25. Other features or combinations of features independent from the operating systems may be used in other embodiments.

Steps S501 and S502 are similar to steps S2 and S3 described with respect to FIG. 4.

Thus, a second size dictionary is obtained after step S502 which comprises a subset of features which are independent of the operating systems of the files.

Embodiments for reducing the first size dictionary in order to obtain the second size dictionary, will now be described.

Figure 19:
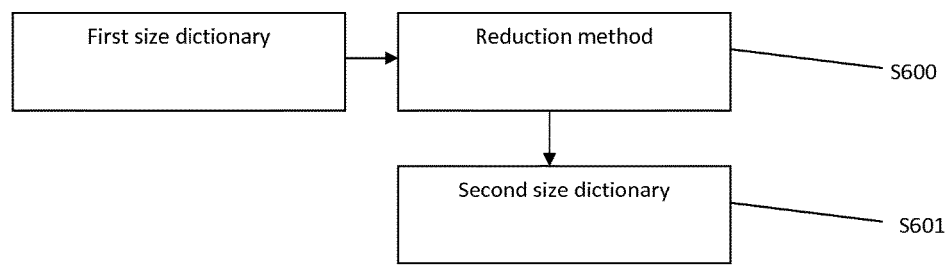
FIG. 19 illustrates a flow-chart of an embodiment of a method for reducing the size of the first size dictionary.

A generalized flow chart of a reduction method of the first size dictionary is provided in FIG. 19 (see steps S600, S601 in FIG. 19).

According to some embodiments (see steps S700, S701, S702 in FIG. 20), the reduction method is applied to a set of vectors representing each file from the malware files and non malware files based on the features listed in the first size dictionary.

For instance, if features $F_1$ to $F_N$ are present in the first size dictionary, each file of the malware files and non malware files is converted into a vector comprising the value of the features $F_1$ to $F_N$ in said file. This conversion comprises converting each feature of the files into numerical values stored in the vector, based on the features present in the first size dictionary.

The values may include the values of said features (for instance, if the feature is file size, the value of said file size) or values reflecting the presence of said feature in the file (for instance if the feature is a string, the value reflects the presence of said string in the file—1 may reflect the presence of the string in the file, and 0 its absence, these values being non limiting examples). The value of a feature in a file may also comprise a plurality of values. The value may also reflect the occurrence of the feature in the file.

Various non limiting examples have already been provided for these vectors (see e.g. vectors 203 and 204 in FIG. 13, vectors 26 and 27 in FIG. 13A, FIG. 16, and vectors 165 and 166 in FIG. 17). The output of the reduction method is a subset of features selected from the features present in the first size dictionary. According to some embodiments, the subset of features comprises features which may be among the most representative of malware files.

The reduction method may be performed by a reduction module (not represented), which receives data from the extraction module already described. This reduction module may be operable on a processor. It may be part of the malware detector module 7 but this is not mandatory. In one embodiment, part of the reduction module is operable on a first processor, and part of the reduction module is operable on the malware detector module 7. In this case, the first processor is able to communicate data with the processor on which the malware detector module 7 is operable. In this embodiment, part of the reduction may be performed by the part of the reduction module located in the first processor, and the other part of the extraction may be performed by the other part of the reduction module located in the malware detector module 7.

Various reduction methods can be used.

In an embodiment, a statistical algorithm is used to obtain the subset of features which will be part of the second size dictionary. Statistical algorithms may for instance be based on the frequency of appearance of a feature. They may also be based on correlation methods.

For instance, features may be often present both in the malware files and non malware files. In this case, these features are not representative of the malware files. However, features which appear only or mostly in the malware files are representative of malware files and should be selected.

Figure 20A:
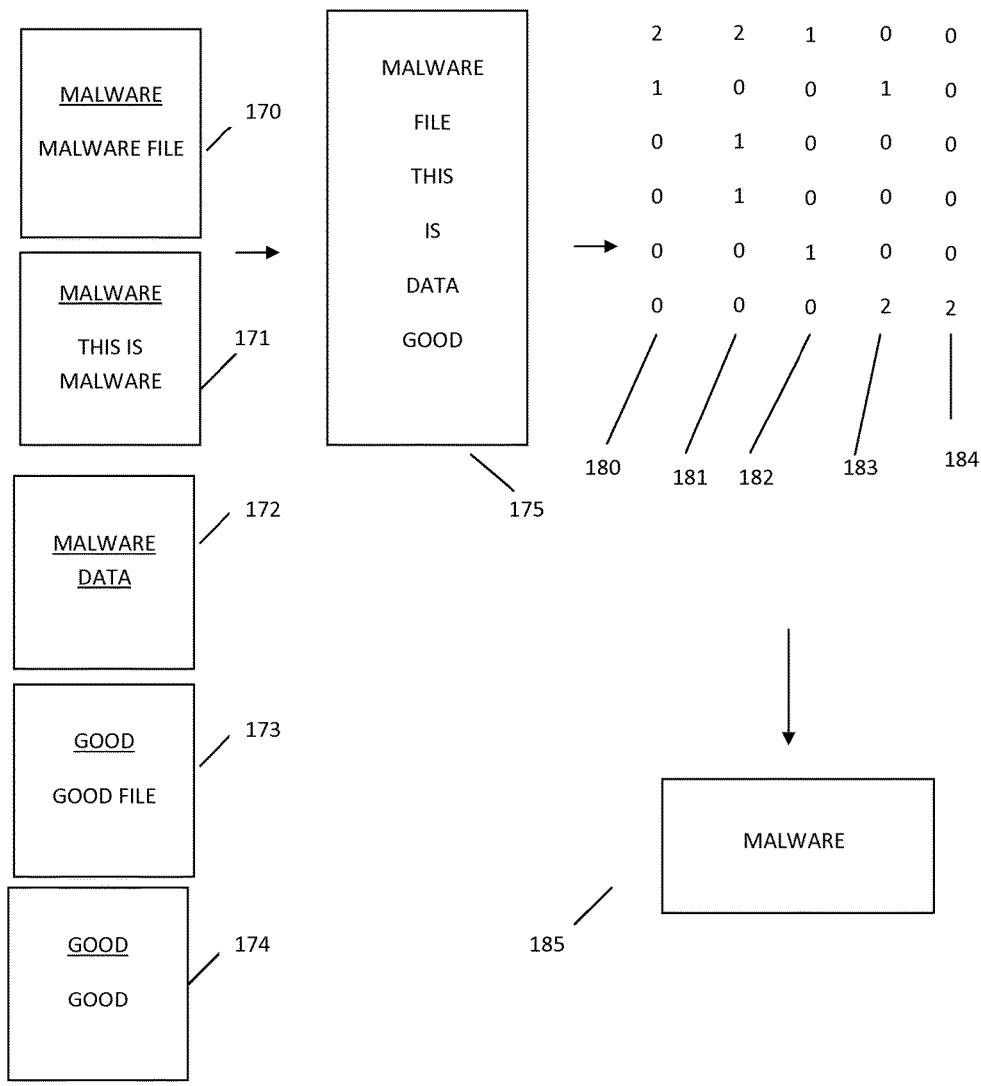
FIG. 20A illustrates a particular example of a reduction method for reducing the first size dictionary.

A highly simplified and non limiting example is provided with respect to FIG. 20A.

Malware files 170, 171, 172 and non malware files 173, 174 are depicted. Strings from these files are extracted to build the first size dictionary 175. Vectors 180, 181, 182, 183 and 184 are built respectively for files 170, 171, 172, 173, 174. In this embodiment, the values stored in the vectors represent the number of times the strings appear in the file.

A statistical method is applied on the vectors 180, 181, 182, 183 and 184. For instance, the statistical method identifies that the string "MALWARE" appears in 100% of the malware files, whereas it never appears in the non malware files. Thus, this string may be selected in the second size dictionary. To the contrary, the string "GOOD" only appears in the non malware files and may be ignored in the second size dictionary.

Examples of statistical algorithms include correlation based algorithms, TF-IDF (Term Frequency-Inverse Document Frequency) algorithm, etc. It is to be noted that the reduction method is not limited to these examples.

In another embodiment, a linear reduction algorithm is used. According to some embodiments, vectors are built as explained with reference to FIG. 20 and fed to the linear reduction algorithm, which outputs a subset of features from the one present in the first size dictionary.

Examples of linear reduction algorithms include: logistic regression, linear SVM ("Support Vector Machine"), etc.

These methods do not necessarily rely on the frequency of appearance of a feature.

It is to be noted that the reduction method is not limited to these examples.

In another embodiment, a non-linear reduction algorithm is used. According to some embodiments, vectors are built as explained with reference to FIG. 20 and fed to the non-linear reduction algorithm, which outputs a subset of features from the one present in the first size dictionary.

Examples of non-linear reduction algorithms include: unsupervised neural networks, neural networks with non-linear activation function, SVM with non-linear kernel, Denoising Autoencoders and Restricted Boltzmann Machines. These methods are used for "feature learning", i.e., construction of high level non-linear features.

Denoising Autoencoders are for instance described in "*Stacked Denoising Autoencoders: Learning Useful Representations in a Deep Network with a Local Denoising Criterion*", Vincent P. et al., Journal of Machine Learning Research 11 (2010) 3371-340, which is herein incorporated by reference.

Restricted Boltzmann Machine is described e.g. in Larochelle, H., Bengio, Y. (2008), "*Classification using discriminative restricted Boltzmann machines*" Proceedings of the 25th international conference on Machine learning, ICML '08, p. 536, Hinton, G. E., Osindero, S. & Teh, Y.-W, A fast learning algorithm for deep belief nets, Neural Computation 18, 1527-1554 (2006), and Wikipedia, https://en.wikipedia.org/wiki/Restricted_Boltzmann_machine. These documents are herein incorporated by reference.

It is to be noted that the reduction method is not limited to these examples.

A combination of a plurality of reduction algorithms can be used, which may be successively applied.

For instance, a reduction algorithm provides a first output O1 from an input I1 (I1 being the first size dictionary or vectors built on the basis of said first size dictionary, as explained in FIG. 20). O1 comprises a first subset of features selected from the first size dictionary.

Then, O1 is used as an input I2 of another reduction algorithm which provides an output O2 (O2 being the subset of features selected for the second size dictionary, wherein the size of the subset of features O2 is lower than the size of the subset of features O1). For instance (see FIG. 21), the reduction algorithms comprise successively a statistical reduction (step S800), a linear reduction (step S801), and a non linear reduction (step S802). Other combinations may be used.

A subset of features is thus selected based on the result of the reduction algorithm. This subset of features is stored in the second size dictionary.

For instance, if the first size dictionary comprises strings $Strg_1$ to $Strg_N$, the second size dictionary comprises strings $Strg_1$ to $Strg_n$, with n<N. The same applies to other possible features or a combination of multiple features, which have already been described.

The second size dictionary dictates a size and a content of a vector representing each malware file and non malware file, for feeding to the deep learning algorithm of the malware detector. Thus, the number of features of the second size dictionary has an impact on the ability of the deep learning algorithm to process the malware files and non malware files. According to some embodiments, the reduction methods are tuned until the size of the second size dictionary is adequate to allow processing by the deep learning algorithm of all vectors representing each malware file and non malware file. This tuning includes for instance modifying thresholds or weights used in the reduction methods. This tuning may be performed based on heuristics Reference is now made to FIG. 22 which describes a method for building vectors for feeding a malware detector comprising a deep learning algorithm.

Files, such as malware files or non malware files, which are to be fed to the deep learning algorithm, are converted into vectors by using a dictionary (feature based dictionary). The term "vector" encompasses any group of data which may be at least partially ordered. The data present in the vector may of course be stored in a matrix, or any adapted form.

The dictionary used to build the vectors may be in fact the second size dictionary as described in the various embodiments above.

These vectors are suitable for being processed by the deep learning algorithm, for determining the prospects of whether said file constitutes malware or not.

The construction of the vectors may be performed by a building module (not represented in the Figures). This building module may be operable on a processor. It may be part of the malware detector module 7 but this is not mandatory. In one embodiment, part of the building module is operable on a first processor, and part of the building module is operable on the malware detector module 7. In this case, the first processor is able to communicate data with the processor on which the malware detector module 7 is operable. In this embodiment, part of the vector building may be performed by the part of the building module located in the first processor, and the other part of the vector building may be performed by the other part of the building module located in the malware detector module 7.

Figure 22:
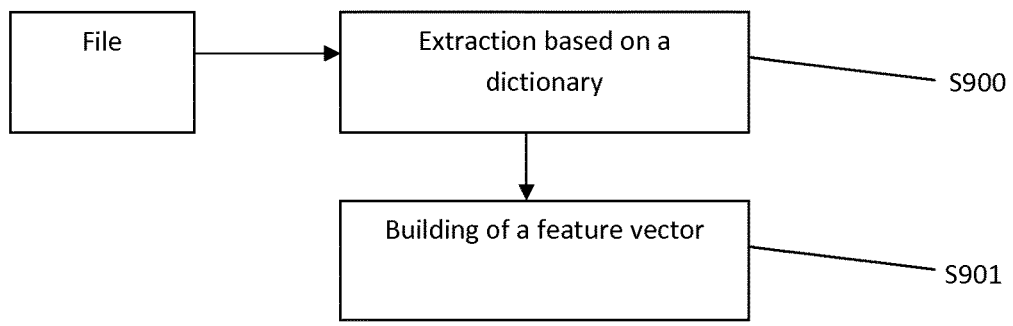
FIG. 22 illustrates a flow-chart of an embodiment of a method for constructing a vector for each file based on a dictionary.

The construction of the vectors may comprise extracting features from each file based on features present in a dictionary (step S900 in FIG. 22). This step may comprise seeking in said file for the features present in the dictionary (for instance, seeking for strings or opcodes), or may also comprise seeking in said file for the values of said features in the file (for instance, seeking for the value of a feature of a header of the file). It may also comprise calculating the value of a feature from the file (such as the entropy of the file).

This extraction is performed from at least a part of the file, said part depending on the location of the features in the file. For instance, said part may comprise the payload of the file, the source code, the header, etc.

It then comprises building a vector representing said each file based on the extracted features, said vector being suitable for being processed by the deep learning algorithm, for determining the prospects of whether said file constitutes malware or not (step S901).

As illustrated in FIG. 23, if the dictionary comprises features $F_1$ to $F_n$, each file is associated to a vector comprising the value of features $F_1$ to $F_n$ in said file. This step thus comprises converting the file into vectors comprising numerical values based on features stored in a dictionary.

The value may include the value of said features (for instance, if the feature is file size, the value of said file size) or a value reflecting the presence of said feature in the file (for instance if the feature is a string, the value reflects the presence of said string in the file—same for the presence of an opcode or n-sequence of opcodes).). The value of a feature in a file may also comprise a plurality of values. The value may also reflect the occurrence of the feature in the file.

FIG. 24A represents the vectors 400, 401 obtained for files 128 and 127 of FIG. 8 based on the second size dictionary 141, and FIG. 24B represents the vectors 402, 403 obtained for the files 200, 201 of FIG. 13 based on the second size dictionary 205.

The same applies to the various features and combination of features already described. In particular, it applies to embodiments wherein features are stored by groups of features.

As already described with reference to FIG. 18, according to some embodiments, the files are operable on different operating systems and the features present in the second size dictionary are independent of the operating systems. As a consequence, a vector is built for each file based on the dictionary (which may correspond to the second size dictionary) irrespective of the file operating system. Non-limiting examples of features independent of the operating systems are strings and opcodes.

Figure 25:
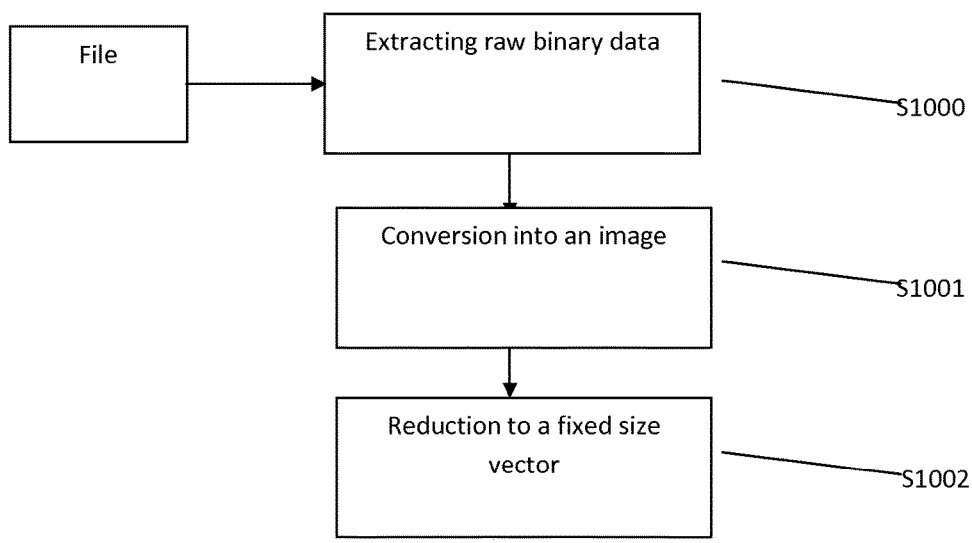
FIG. 25 illustrates an embodiment for converting a file into a vector to be fed to the deep learning algorithm, based on a conversion into an image.

FIG. 25 describes another possible embodiment for building vectors for feeding a malware detector comprising a deep learning algorithm, for determining the prospects of whether said file constitutes malware or not. This embodiment does not involve the use of a dictionary.

The method may comprise the step S1000 of extracting raw binary data from each file. Indeed, it is known that each file comprises a sequence of bytes, each byte comprising eight bits. The raw binary data comprise at least part of this sequence of bytes.

The raw binary data are used to create an image (step S1001). Indeed, as known in the art, the grey level of each pixel of an image may be expressed by a byte. The raw binary data, which all comprise a sequence of bytes, are thus expressed in the form of an image. However, the processing of this image by the deep learning algorithm is cumbersome, in particular in a training phase (discussed further in detail below) of the deep learning algorithm where a large amount of files are fed to the deep learning algorithm. Thus, the size of each image is reduced (step S1002). This reduction provides a fixed size vector, representing the reduced size image. The reshaping of an image into a reduced size image involves image processing. For instance, a method of resampling is used.

This method of building a vector based on a conversion into an image is generally independent of the operating system of the file.

It is to be noted that deep learning algorithms were mainly used in the prior art in the field of science for their ability to handle raw data. According to certain embodiments, the deep learning algorithm is used for malware detection, for which the raw data are, contrary to the assumptions of the prior art, first pre-processed and reduced in order to extract the main features of these files, in order to improve the training phase and the prediction phase of the deep learning algorithm.

Methods for training a malware detector comprising a deep learning algorithm are now described. These methods may rely on the various methods already described (construction of a first and second size dictionary, building of a vector, etc.).

The training phase may be performed by a training module (not represented in the Figures). This training module may be operable on a processor. It may be part of the malware detector module 7 but this is not mandatory. In one embodiment, part of the training module is operable on a first processor, and part of the training module is operable on the malware detector module 7. In this case, the first processor is able to communicate data with the processor on which the malware detector module 7 is operable. In this embodiment, part of the training may be performed by the part of the extraction module located in the first processor, and the other part of the training may be performed by the other part of the training module located in the malware detector module 7.

The training phase uses at least a set of malware files and non malware files, as already described.

Figure 26:
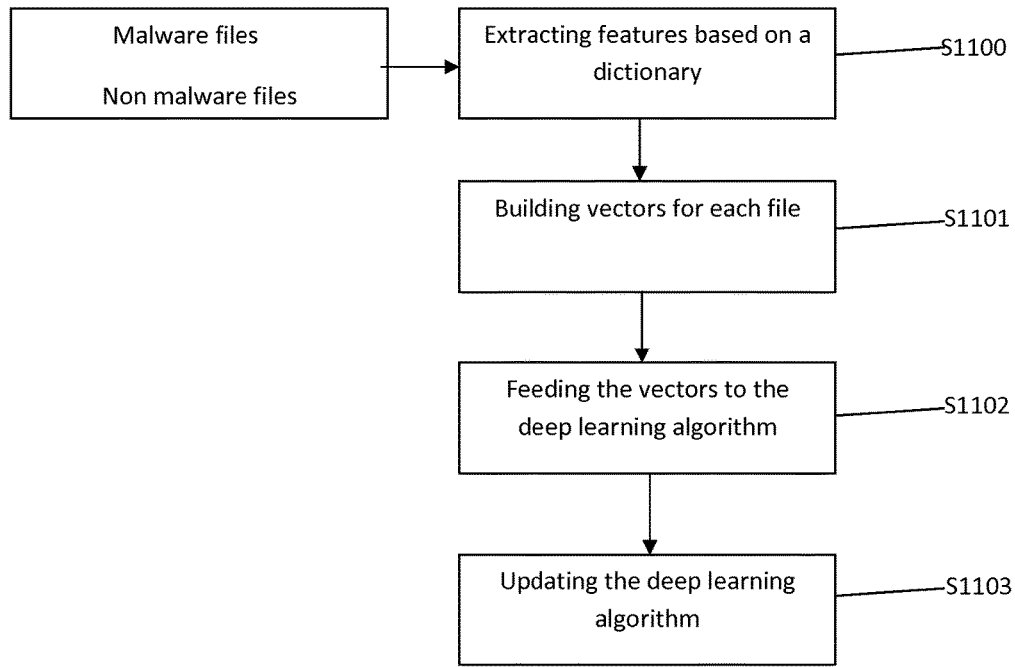
FIG. 26 is a flow-chart of an embodiment of a method for training a deep learning algorithm of a malware detector, based on an input of a plurality of malware files and non malware files.

As depicted in FIG. 26, the method comprises, according to an embodiment, the steps of extracting features from each file among a plurality of malware and non malware files (step S1100), based on features present in at least a dictionary (which may be the second size dictionary as described in the various embodiments above), and building vectors based on the extracted features, each vector representing a file (step S1101).

These steps S1100 and S1101 have already been described in detail above (see e.g. FIGS. 4 to 25). Similarly, the features that may be used in this training phase include the ones already described above (see e.g. FIGS. 4 to 25).

The vectors representing each file may also be obtained by the method described in reference to FIG. 25.

Each vector is then fed to the deep learning algorithm (step S1102).

The deep learning algorithm comprises a prediction model (such as any deep learning algorithm). This prediction model needs to be trained. Based on this prediction model, the deep learning algorithm provides prospects of whether said file constitutes malware or not.

Prospects may comprise at least a probability whether or not said file constitutes malware. For instance, a result could be 80%/20%, which indicates that the prospects that this file constitutes malware are 80%, and the prospects that this file does not constitute malware are 20%, or the result could be only 80% or only 20%. These numbers are non-limiting numbers.

The prospects may also comprise a confidence level, which can be defined as the highest probability between the probability that the file constitutes malware and the probability that the file does not constitute malware. For instance, the confidence level of the prospects 80%/20% is 80% and the confidence level of the prospects 40%/60% is 60%. These numbers are non-limiting numbers.

According to some embodiments, the prospects may be converted into a binary result, such as a positive output if the file constitutes malware, and a negative output if the file does not constitute malware.

In the training phase, all vectors representing the training set are generally fed to the deep learning algorithm. Prior to this phase, it is known whether or not each file of the training set constitutes malware.

Thus, the training module updates (step S1103) the prediction model of the deep learning algorithm by taking into account the comparison between prospects provided by the deep learning algorithm whether each file constitutes malware, and the known malware or non-malware status of each file.

Generally, this update comprises updating weights used by the deep learning algorithm.

This update relies on known techniques, which have been described in the literature, such as the known per se method of "Backpropagation". This method is for instance described in Werbos, P., Beyond Regression: New Tools for Prediction and Analysis in the Behavioral Sciences, PhD thesis, Harvard Univ. (1974), Parker, D. B. Learning Logic Report TR-47 (MIT Press, 1985), Rumelhart, D. E., Hinton, G. E. & Williams, R. J., Learning representations by back-propagating errors, Nature 323, 533-536 (1986), and in the webpage of Wikipedia: https://en.wikipedia.org/wiki/Backpropagation. These documents are all herein incorporated by reference. Another method includes the known per se "Contrastive Divergence" method, which is for instance described in Hinton, G. E., Osindero, S. & Teh, Y.-W., A fast learning algorithm for deep belief nets, Neural Computation 18, 1527-1554 (2006). This document is herein incorporated by reference.

The plurality of malware files and non-malware files which are fed to the deep learning algorithm provide a training of said deep learning algorithm in order to improve its prediction model.

According to some embodiments, and as already described with respect to FIG. 18, the malware files and non-malware files are operable on different operating systems.

According to some embodiments, the dictionary, which may be the second size dictionary described in the various embodiments above, dictates the size and the content of the vectors of the whole set, so that the deep learning algorithm can process them for updating its prediction model. In spite of the vast amount of data that are to be fed to the deep learning algorithm for its training, the extraction, conversion and feeding phases described above allow the deep learning algorithm to be able to process this data.

According to some embodiments, and as described below, a real time processing is performed by the deep learning module for predicting if a file constitutes malware or not.

According to an embodiment (see FIG. 27), the training method comprises the steps (steps S1200) of extracting first features from each file among a plurality of malware and non-malware files, based on features present in a first dictionary, and extracting second features from each file based on features present in a second dictionary, and building (step S1201) vectors based on at least the first and second extracted features, each vector representing a file. The second features are different from the first one. Examples of the first and second features have been provided in the various previous embodiments. As described in these embodiments, a variety of features and combination and features may be used.

The vectors are then fed to the deep learning algorithm (step S1202), and an update of the deep learning algorithm is performed (step S1203).

Steps S1202 and S1203 are similar to steps S1102 and S1103.

Although it has been described that the deep learning algorithm is trained for detecting malware, in some embodiments, the deep learning algorithm is trained to estimate the nature of a file. The various embodiments already described apply mutatis mutandis to this variant. The nature of the file is for instance the reputation of the file. As an example, the reputation of a text file edited by Word™ is better than the reputation of a text file edited by less prestigious text software.

According to some embodiments, the system for malware detection comprises a communication module (not illustrated in the Figures), and may receive a set of malware files and non-malware files through a network, for training its deep learning algorithm from time to time. In some embodiments the communication module is external or at least partially external to the system for malware detection.

Figure 28:
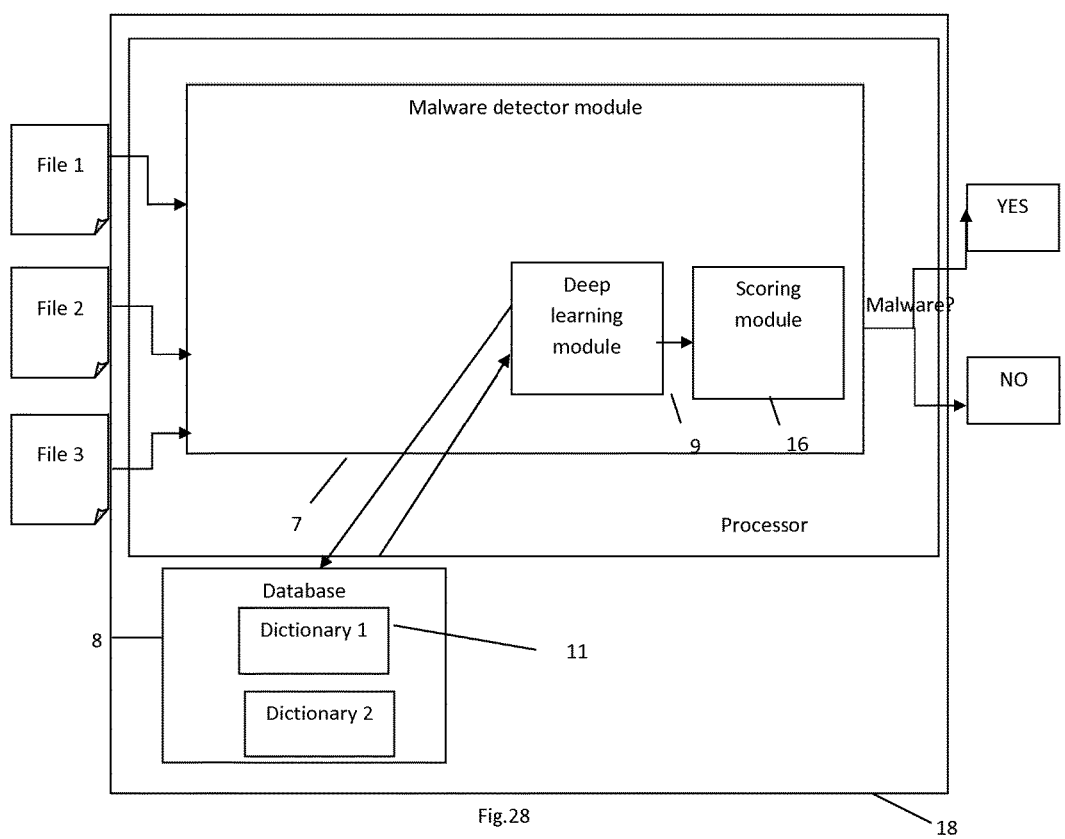
FIG. 28 illustrates a functional block diagram of an embodiment of a system for malware detection according to the invention, further comprising a scoring module.

According to some embodiments, the malware detector module 7 further comprises a scoring module 16 (see FIG. 28). It has to be noted that the scoring module 16 may also not be part of the malware detector module 7 and may be embedded in another processor, in communication with the system for malware detection 18, or in communication with at least the deep learning module. The scoring module 16 may also be only partially part of the malware detection module 7.

The scoring module 16 may comprise at least an algorithm for providing a decision on the file based on the output of the deep learning algorithm.

As already explained, the deep learning algorithm may provide, for each file that is fed to the deep learning module, prospects that said file is a malware file or non malware file.

According to some embodiments, the scoring module 16 receives a probability that a file constitutes malware from the deep learning algorithm, and then provides a binary decision (such as positive output when the file constitutes malware, and negative output when the files does not constitute malware).

In one example, a positive output is provided if the probability that the file constitutes malware is above a certain threshold. Below this certain threshold, a negative output is provided.

According to some embodiments, the deep learning module may provide a plurality of prospects for each file.

This may be the case when several methods are applied to the file in order to predict whether this does or does not constitute malware. These methods may for instance be applied successively to the file.

For instance, the file is fed to the deep learning algorithm by using a vector conversion based on a first dictionary (which may one of the second size dictionary described above) and then by using a vector conversion based on a second dictionary (which may be one of the second size dictionary described above), which differs from the first one. A larger number of methods may be used for each file. Methods as described in FIG. 26 and FIG. 27 may be used for each file.

Thus, the scoring module 16 receives for a file from the deep learning algorithm first prospects $P_1$ (result of the method using the first dictionary), and second prospects $P_2$ (result of the method using the second dictionary).

$P_1$ comprises for instance the values $P_{1X}$ and/or $P_{1Y}$, wherein $P_{1X}$ indicates the probability that said file constitutes malware, as determined by the deep learning algorithm, and/or $P_{1Y}$ indicates the probability that said file does not constitute malware. The same applies to the second prospects $P_2$.

Figure 29:
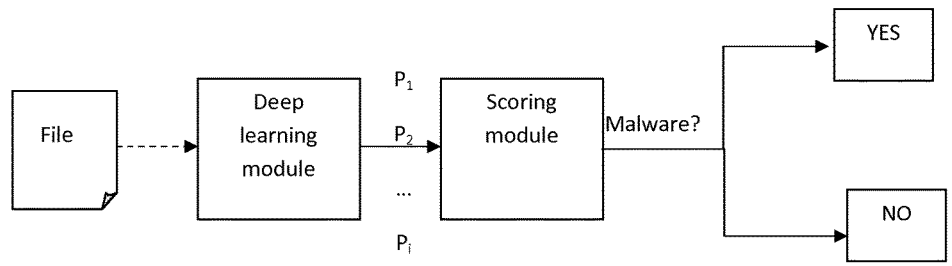
FIG. 29 illustrates an embodiment of the operation of said scoring module.

In a more general way, if "i" different prediction methods are used for a file, the scoring module 16 receives for each file a plurality "i" prospects Pi from the deep learning module indicating whether said file does or does not constitute malware. This set of "i" prospects $P_1$ to $P_i$ is fed to the scoring module 16 (see FIG. 29).

The scoring module 16 needs to aggregate these prospects in order to provide aggregated prospects and/or a binary result.

The aggregation of the different prospects may be performed in various ways. Some require the scoring module 16 to be trained, and some do not require the scoring module 16 to be trained.

In one embodiment, the scoring module 16 aggregates the different prospects provided by the deep learning algorithm for a given file, and provides a binary response comprising:
  a positive response, indicating that said file constitutes malware, or
  a negative output, indicating that said file does not constitute malware.

In one embodiment, the scoring module 16 uses a voting method to aggregate different prospects received for a given file by the deep learning algorithm.

For instance, the voting method may be based on the rule of majority. If the majority of the prospects indicate that the file constitutes malware, then a positive output is provided by the scoring module 16.

In another embodiment, the scoring module 16 provides a binary result based on the prospects whose confidence level is the highest. In one example, the confidence level is defined as the highest probability in each prospect Pi.

For instance, if it is assumed that the deep learning algorithm provides for a file the following prospects (using the same notation as above):
  $P_1$: [$P_{1X}$=80%, $P_{1Y}$=20%]; Confidence level: 80%.
  $P_2$: [$P_{2X}$=10%, $P_{2Y}$=90%]; Confidence level: 90%.
  $P_3$: [$P_{3X}$=60%, $P_{3Y}$=40%]. Confidence level: 60%.
  These numbers are non-limiting numbers.

Although the majority of the prospects indicates that the file is considered as malware (prospects P1 and P3), the confidence level of the second prospects $P_2$ is the highest. Thus, the scoring module 16 outputs a negative result, indicating that the file does not constitute malware.

In another embodiment, the scoring module 16 combines the different prospects provided by the deep learning algorithm for each file according to a predetermined formula (which might be a linear formula or non-linear formula).

In another embodiment, the scoring module 16 comprises a neural network for combining the prospects provided by the deep learning algorithm for each file.

The neural network of the scoring module 16 aggregates the different prospects to provide unique prospects or a binary result.

Figure 30:
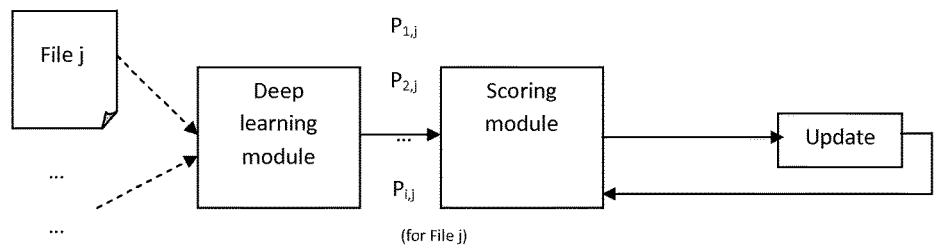
FIG. 30 illustrates an embodiment of a method for training a neural network of a scoring module of the malware detector.

In order to improve the performances of this neural network, said neural network may be trained to improve its ability to aggregate the different prospects provided for a file, as illustrated in FIG. 30.

A plurality of malware and non malware files are used to train the neural network of the scoring module 16 (Files j in FIG. 30). This training set may be different from the one used to train the deep learning algorithm itself. The training may be performed by the training module already mentioned above, or by an independent training module, also operable on a processor (as defined for the above-cited training module).

For each file (for instance "File j") of the malware files and non malware files, the deep learning module provides a plurality of prospects $P_{1,j}$ to $P_{i,j}$, which are fed to the neural network of the scoring module 16 for its training.

According to some embodiments, the following steps are performed for each file of the training set (embodiments for these steps were already described in the different previous embodiments):

- extracting features from said each file based on features present in a first dictionary, in order to build a first set of vectors representing each file,
- feeding the first set of vectors to the deep learning algorithm,
- obtaining a first set of prospects on whether the files constitute malware or not,
- extracting features from said each file based on features present in a second dictionary, the second dictionary being different from the first dictionary, in order to build a second set of vectors representing each file,
- feeding the second set of vectors to the deep learning algorithm,
- obtaining at least a second set of prospects on whether or not the files constitute malware.

In other embodiments, the method described in reference to FIG. 25 is used to provide a first set of prospects, and a method using a feature based dictionary (as already described in FIGS. 4 to 24) is used to provide a second set of prospects.

These different sets of prospects are fed to the neural network of the scoring module 16, which provides unique prospects (such as a unique probability that each file does or does not constitute malware, from the aggregation of its input). These unique prospects may be converted into a binary result, for instance by comparing the unique prospects with a threshold.

By comparing the output of the scoring module 16 with the known malware status or non malware status of the file, the model used by the neural network (and in particular the weights used in the model) is updated to improve the aggregation performed by the neural network.

The update of the model used by the neural network may rely on the known per se and already cited "Backpropagation" method or "Contrastive Divergence" method.

Figure 31:
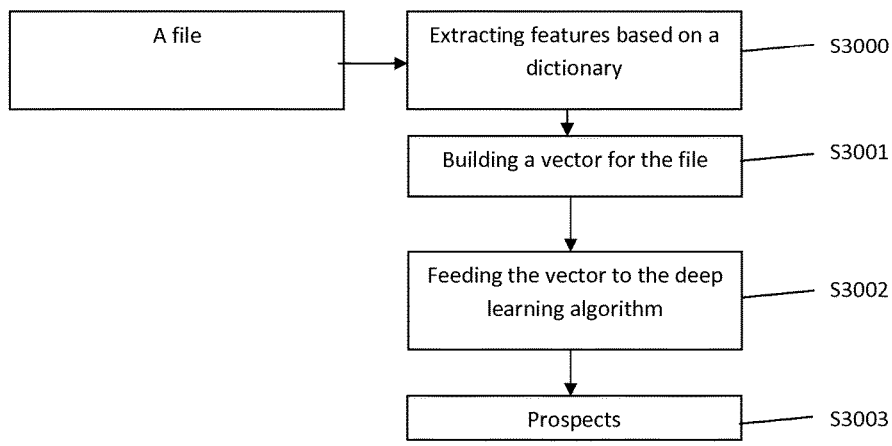
FIG. 31 illustrates an embodiment of a method for providing the prospects that a file is a malware or not.

Reference is now made to FIG. 31, which describes an embodiment of a method for detecting malware. This detection method may be performed by the system for malware detection, such as the one of FIG. 3 or FIG. 28.

This detection method is in general performed after the deep learning algorithm of the malware detector module has been trained according to the various embodiments described above. According to some embodiments, the deep learning algorithm may be trained from time to time, and each user of the system for malware detection receives an updated version of the prediction model of the deep learning algorithm.

A file is received by the system for malware detection 18, which has to detect whether this file does or does not constitute malware.

As mentioned in some of the different embodiments described above, a step S3000 of extracting features from the file based on features present in at least a dictionary is performed. This dictionary may be the second size dictionary described in the various previous embodiments, and obtained as described in these various previous embodiments. The step S3000 of extracting features of a file has already been described in the various previous embodiments, and for instance with respect e.g. to FIG. 22.

According to step S3001, a step of building a vector based on the extracted features may be performed. Again, this step has already been described in the various previous embodiments, and for instance with respect e.g. to FIG. 22.

According to step S3002, the vector is fed to the deep learning algorithm of the malware detector module.

Figure 27:
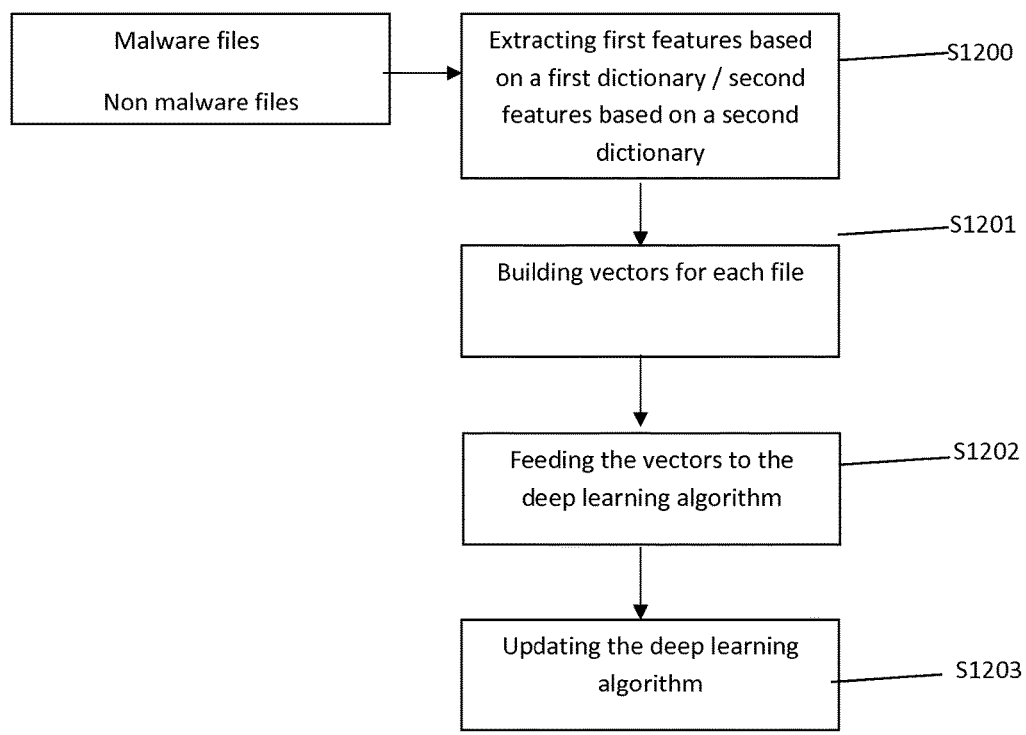
FIG. 27 is a flow-chart of another embodiment of a method for training a deep learning algorithm of a malware detector, based on an input of a plurality of malware files and non malware files, wherein the files are converted based on two dictionaries.

The deep learning algorithm, which may have been previously trained as explained with reference to FIGS. 26 and 27, provides prospects of whether said file does or does not constitute malware (step S3003). These prospects provide not only information on the predicted status of the file (malware/non malware) but also provides information on the level of confidence of the prediction.

If necessary (for instance when several different prediction methods are used for a given file) the different prospects obtained for a given file are fed to the scoring module 16 for providing a decision whether or not said file constitutes malware. Examples for the aggregation performed by the scoring module 16 include the one described with reference to FIG. 29 and FIG. 30.

As mentioned, the scoring module 16 may aggregate the different prospects into a binary result using methods such as e.g. voting method and/or a method based on the confidence of the prospects (these methods for combining the prospects are only examples). According to some embodiments, the scoring module 16 comprises a neural network which aggregates the different prospects provided by the deep learning algorithm for the file, into unique aggregated prospects (such as a unique probability). This neural network may have been previously trained as explained with reference to FIG. 30. According to some embodiments, the scoring module 16 converts the unique aggregated prospects into a binary result (such as a positive output if the file is detected as constituting malware, and a negative output if the file is detected as constituting non malware file), by comparing the prospects with at least a threshold.

According to some embodiments, a vector representing the file is created based on the method described in FIG. 25.

This vector is fed to the deep learning algorithm which provides prospects of whether or not said file constitutes malware.

According to some embodiments, first prospects are obtained for a file based on the method described with reference to FIG. 25. At least second prospects are obtained for a file based on at least a prediction method based on a dictionary (example of a prediction method based on a dictionary was described e.g. in FIG. 31).

The scoring module 16 may then combine at least the prospects provided by the method of FIG. 25 with the prospects provided by at least a method based on a dictionary, to provide a decision on whether the file constitutes malware.

In one embodiment, the system for malware detection comprises a notification module (not represented) operable on a processor and which may raise an alert if the prospects or the binary result indicate that the file constitutes malware. This notification module is not necessarily part of the system for malware detection and may be located at least partially externally to this system.

In one embodiment, the system for malware detection comprises a prevention module (not represented) operable on a processor. The prevention module may also be at least external to the system for malware detection and communicate with this system.

If it has been detected by the system for malware detection that the file constitutes malware (based on the prospects or binary result provided by the system for malware detection), this prevention module may take adapted actions to prevent the user from the threat of this malware file. According to some embodiments, the prevention module may delete the malware file, modify the malware file to prevent him from harming the user's system, store it in quarantine, or take any necessary actions.

According to some embodiments, the detection of whether a file constitutes malware or does not constitute malware is performed in real-time. In particular, the file is converted into a vector, fed to the deep learning algorithm which provides prospects or binary result if the file constitutes malware, in real time. The pre-processing of the file before its feeding to the deep learning algorithm helps accelerating the processing of the file.

According to some embodiments, the detection of whether a file constitutes malware or does not for a user's system is performed in real time such as its duration may not be felt by the user. The user may thus perform his tasks on the system without feeling the duration of the detection which has been performed.

According to some embodiments, the duration of the prediction by the system for malware detection of whether a file constitutes malware is such that it does not affect the user's experience of his system.

According to some embodiments, since the detection of a malware may be performed in short time, prevention (which is the next phase of detection and comprises taking the necessary actions to prevent the user from the threat of the malware file once it has been detected) may also be performed in real time by the prevention module.

According to embodiments of the method, the deep learning algorithm provides prospects of whether a file constitutes malware or not, even if the malware detector has never previously received said file as an input. In other words, this means that although said file was never used in the training set of the deep learning algorithm (see e.g. FIGS. 26 and 27 for examples of the training of the deep learning algorithm), the deep learning algorithm still detects if said file constitutes malware with a satisfactory level of confidence.

According to an embodiment, the method comprises extracting features of a file operating on a given operating system, based on features present in a dictionary and that are independent of said operating system. This step has already been described above (see e.g. FIG. 18). After the vector is built based on the extracted features, and fed to the malware detector, the deep learning algorithm determines the prospects of whether said file constitutes malware or not. As a consequence, the detection may be performed by the same deep learning module and malware detector module even if different files operable on different operating systems are fed to this malware detector module.

Figure 32:
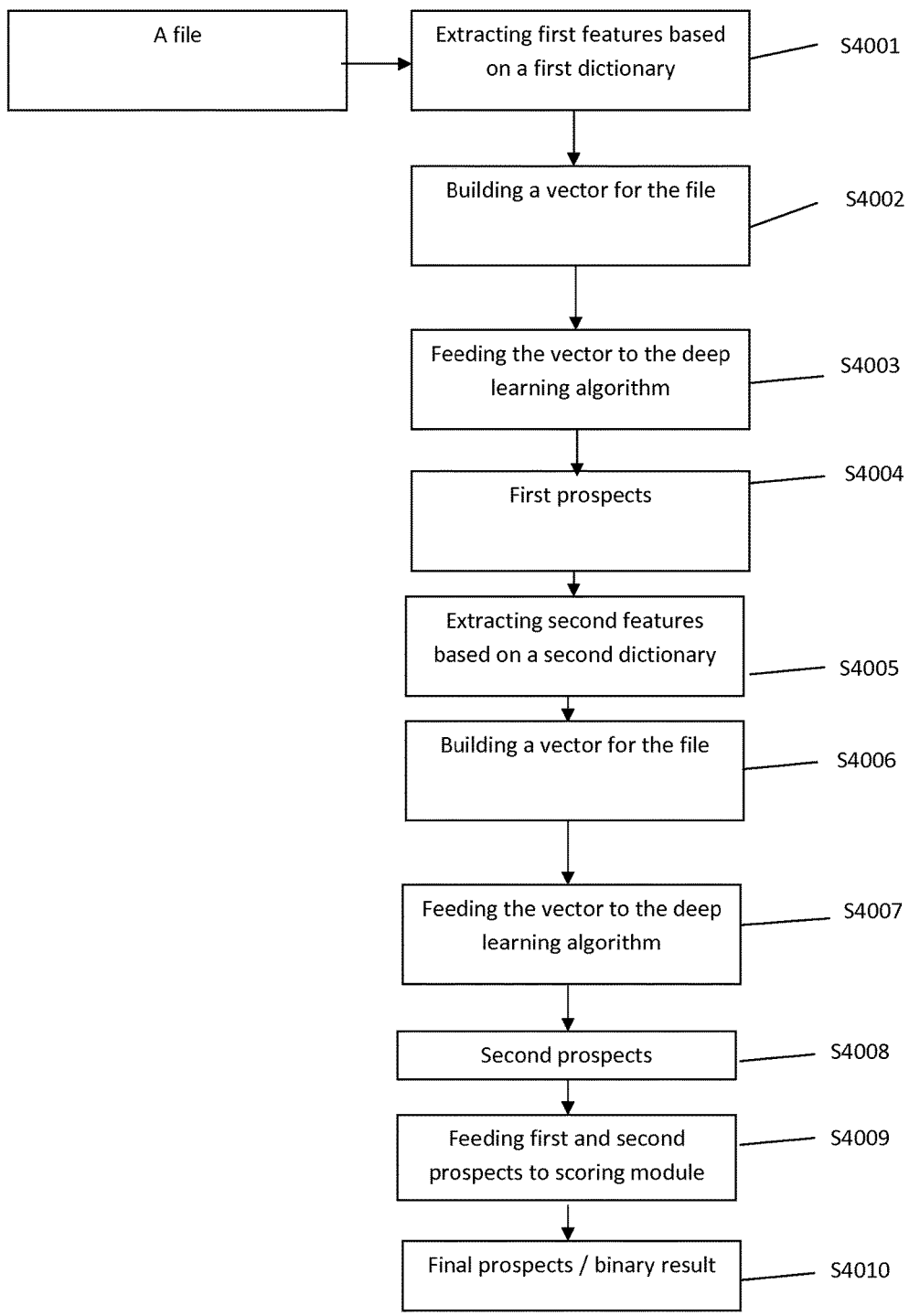
FIG. 32 illustrates an embodiment of a method for providing the prospects that a file is a malware or not, based on the aggregation of a plurality of sets of prospects.

According to an embodiment, and as illustrated in FIG. 32, the following steps are performed (embodiments already described above hereby apply):
  extracting first features from a file based on features present in a first dictionary (step S4001),
  building a vector based on the first features (step S4002),
  feeding the vector to the deep learning algorithm, for providing first prospects on whether the file constitutes malware or not (steps 4003, 4004),
  extracting second features from the file based on features present in a second dictionary which is different from the first dictionary (step S4005),
  building a vector based on the second features (step S4006),
  feeding the vector to the deep learning algorithm, for providing second prospects on whether the file constitutes malware or not (steps S4007 and S4008).

At least the first and second prospects are then aggregated by the scoring module 16 to provide final prospects or a binary result (steps S4009 and S4010). Embodiments already described for this aggregation hereby apply. In particular, this aggregation may be performed after the scoring module 16 has been trained in accordance with previously described embodiments, when said scoring module comprises a neural network.

This aggregation applies to a larger number of prospects provided by the deep learning algorithm, for instance when "i" different prediction methods are used for a file.

According to an embodiment, first prospects are obtained by using the method of FIG. 25 for converting a file into an image which is then represented by a fixed size vector, and second prospects are obtained by using a dictionary (such as the second size dictionary already described) to convert the file into a vector. At least the first and second prospects are then combined as mentioned above by the scoring module 16. Of course, a larger number of prospects may be combined by using various different prediction methods.

According to some embodiments, the deep learning module of a given user receives an update of its prediction model from time to time from the training module, e.g. through a network. The training module performs training of the prediction model of the deep learning algorithm according to the various embodiments described above.

The invention contemplates a computer program being readable by a computer for executing one or more methods of the invention. The invention further contemplates a machine-readable memory tangibly embodying a program of instructions executable by the machine for executing one or more methods method of the invention.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A method of building vectors for feeding to a deep learning algorithm of a malware detector, the method comprising:
building a first size dictionary, by extracting features from a plurality of malware files and non-malware files,
reducing the size of the first size dictionary, in order to obtain a subset of the features of the first size dictionary, and a second size dictionary being formed from at least the subset of the features of the first size dictionary, the second size dictionary being of lower size than the first size dictionary,
the method further comprising, for a plurality of files to be fed to the malware detector:
extracting features from each file based on features present in the second size dictionary, wherein at least a first subset of the files is operable on an operating system which is different from an operating system on which a second subset of the files is operable, wherein the features are independent of operating systems so that a vector is built for each file based on the second size dictionary irrespective of the file operating system,
building a vector representing said each file based on the extracted features, the vector being suitable for being processed by the deep learning algorithm, for determining prospects of whether the file constitutes malware or not based on a model of said deep learning algorithm, wherein each vector is suitable to be processed by the same model of the deep learning algorithm.

2. The method according to claim 1, wherein the features comprise at least one of the following features:
operating codes of the files, or
strings present in the content of the files, or
parts of a header of the files, or
strings present in the content of the files, or
strings present in the content of files and parts of a header of files, or
parts of a header of the files, and operating codes of files.

3. The method according to claim 1, wherein the files comprise malware files and non malware files, and the dictionary dictates a size and the content of a vector representing each malware file and non malware file, for real time processing of each vector by the deep learning algorithm.

4. The method according to claim 1, wherein the prospects comprise, for each file, a probability that the file constitutes malware.

5. The method according to claim 1, comprising:
feeding a plurality of vectors representing a plurality of malware files and non malware files to the deep learning algorithm, and
updating a model used by the deep learning algorithm, based on the comparison between prospects provided by the deep learning algorithm whether each file constitutes malware, and a real malware status of each file.

6. The method according to claim 1, comprising:
feeding the vector representing a file to the deep learning algorithm, and
providing prospects of whether the file constitutes malware or not.

7. The method according to claim 1, comprising:
feeding the vector representing a file to the deep learning algorithm, and
providing prospects of whether the file constitutes malware or not, even when it has never previously received the file as an input.

8. A method of training a malware detector comprising a deep learning algorithm, the method comprising:
building a first size dictionary, by extracting features from a plurality of malware files and non-malware files,
reducing the size of the first size dictionary, in order to obtain a subset of the features of the first size dictionary, and a second size dictionary being formed from at least the subset of the features of the first size dictionary, the second size dictionary being of lower size than the first size dictionary,
extracting features from each file among a plurality of malware and non-malware files, based on features present in at least the second size dictionary, wherein at least a first subset of the files is operable on an operating system which is different from an operating system on which a second subset of the files is operable, wherein the features are independent of the operating systems so that a vector is built for each file based on the second size dictionary irrespective of the file operating system,
building vectors based on the extracted features, each vector representing a file,
feeding the vectors to the deep learning algorithm, for providing prospects of whether the file constitutes malware or not,
updating a model used by the deep learning algorithm, based on the comparison between prospects provided by the deep learning algorithm based on said model whether each file constitutes malware, and a real malware status of each file, for training the malware detector to provide prospects of whether a file constitutes malware or not, wherein each vector is processed by the same model of the deep learning algorithm.

9. The method according to claim 8, wherein the features comprise at least one of the following features:
operating codes of the files, or
strings present in the content of the files, or
parts of a header of the files, or
strings present in the content of the files, or
strings present in the content of files and parts of a header of files, or
parts of a header of the files, and operating codes of files.

10. The method according to claim 8, comprising:
extracting first features from each file among a plurality of malware and non-malware files, based on features present in the second-size dictionary,
extracting second features from each file based on features present in another dictionary of smaller size than the first size dictionary, and
building vectors based on the first and second extracted features, each vector representing a file.

11. A method of training a malware detector comprising a deep learning algorithm, the method comprising:
building a first size dictionary, by extracting features from a plurality of malware files and non-malware files,
reducing the size of the first size dictionary, in order to obtain a subset of the features of the first size dictionary, and a second size dictionary being formed from at least the subset of the features of the first size dictionary, the second size dictionary being of lower size than the first size dictionary,
extracting features from each file among a plurality of malware and non-malware files, based on features present in at least the second size dictionary, wherein at least a first subset of the files is operable on an operating system which is different from an operating system on which a second subset of the files is operable, wherein the features are independent of the operating systems so that a vector is built for each file based on the second size dictionary irrespective of the file operating system, building vectors based on the extracted features, each vector representing a file, feeding the vectors to the deep learning algorithm, for providing an estimation of the nature of each file, updating a model used by the deep learning algorithm, based on the comparison between an estimation provided by the deep learning algorithm based on said model on the nature of each file and a known nature of the files, wherein each vector is processed by the same model of the deep learning algorithm.

12. The method of claim 11, wherein the nature of the file is the reputation of the file.

13. A method of training a malware detector comprising a deep learning algorithm and a scoring module, the method comprising:

building a first size dictionary, by extracting features from a plurality of malware files and non-malware files, reducing the size of the first size dictionary, in order to obtain a subset of the features of the first size dictionary, and a second size dictionary being formed from at least the subset of the features of the first size dictionary, the second size dictionary being of lower size than the first size dictionary, the method comprising, for each of a plurality of files among a plurality of malware files and non-malware files:

extracting features from the file based on features present in the second size dictionary, in order to build a first vector representing the file, feeding the first vector to the deep learning algorithm, obtaining a first set of prospects on whether the file is a malware or not, extracting features from the file based on features present in another dictionary, the another dictionary being different from the second size dictionary and of smaller size than the first size dictionary, in order to build a second vector representing the file, feeding the second vector to the deep learning algorithm, obtaining a second set of prospects on whether the file is a malware or not; and updating a neural network used by the scoring module, based on at least the first set of prospects and the second set of prospects, for training the scoring module to provide a decision of whether a file constitutes malware or not.

14. A method of detecting malware, comprising:

building a first size dictionary, by extracting features from a plurality of malware files and non-malware files, reducing the size of the first size dictionary, in order to obtain a subset of the features of the first size dictionary, and a second size dictionary being formed from at least the subset of the features of the first size dictionary, the second size dictionary being of lower size than the first size dictionary, extracting features from a file based on features present in at least the second size dictionary, building a vector based on the extracted features, wherein the features are independent of operating systems so that the vector is built for the file based on the second size dictionary irrespective of an operating system of the file, feeding the vector to a malware detector comprising a deep learning algorithm, and determining prospects of whether the file constitutes malware or not, based on a model of said deep learning algorithm, wherein said vector is suitable to be processed by said model of the deep learning algorithm irrespective of the file operating system.

15. The method according to claim 14, wherein the features comprise at least one of the following features:

operating codes of the files, or strings present in the content of the files, or parts of a header of the files, or strings present in the content of the files, or strings present in the content of files and parts of a header of files, or parts of a header of the files, and operating codes of files.

16. The method according to claim 14, wherein the prospects comprise at least a probability that the file is a malware or not.

17. The method according to claim 14, wherein the files fed to the malware detector are operable on different operating systems and the features are independent of the operating systems so that a vector is built for each file based on the second size dictionary irrespective of the file operating system.

18. The method according to claim 14, comprising providing prospects of whether a file constitutes malware or not even when the malware detector has never previously received the file as an input.

19. The method according to claim 14, comprising:

extracting first features from each file based on features present in the second size dictionary, extracting second features from each file based on features present in another dictionary of smaller size than the first size dictionary, and building vectors based on at least the first and second extracted features, each vector representing a file.

20. The method according to claim 14, wherein the determination of the prospects of a file to constitute malware is done in real time.

21. A method of detecting malware, comprising:

building a first size dictionary, by extracting features from a plurality of malware files and non-malware files, reducing the size of the first size dictionary, in order to obtain a subset of the features of the first size dictionary, and a second size dictionary being formed from at least the subset of the features of the first size dictionary, the second size dictionary being of lower size than the first size dictionary, extracting first features from a file based on features present in the second size dictionary, building a vector based on the first features, feeding the vector to the deep learning algorithm, for providing first prospects on whether the file constitutes malware or not, extracting second features from the file based on features present in another dictionary which is different from the second size dictionary and of smaller size than the first size dictionary, building a vector based on the second features, feeding the vector to the deep learning algorithm, for providing second prospects on whether the file constitutes malware or not, providing a result on whether the file constitutes malware or not, based on at least the first and second prospects.

22. The method according to claim 21, wherein the result is provided by a neural network which aggregates at least the first and second prospects.

23. The method according to claim 21, wherein the result is a binary result which is provided based on the prospects whose confidence level is the highest.

24. The method according to claim 21, wherein the result is a binary result which is provided based on a voting method.

25. The method according to claim 21, wherein the features of the second size dictionary and of the another dictionary comprise at least one of the following features:
operating codes of the files, or
strings present in the content of the files, or
parts of a header of the files, or
strings present in the content of the files, or
strings present in the content of files and parts of a header of files, or
parts of a header of the files, and operating codes of files.

26. The method according to claim 21, comprising feeding a plurality of files to the malware detector that are operable on different operating systems, wherein the features of the second size dictionary and of the another dictionary are independent of the operating systems.

27. The method according to claim 21, comprising providing a result of whether a file constitutes malware or not even when the malware detector has never previously received the file as an input.

28. A system for building vectors for feeding to a deep learning algorithm of a malware detector, the system comprising a hardware processor and being configured to, by the hardware processor:
build a first size dictionary, by extracting features from a plurality of malware files and non-malware files,
reduce the size of the first size dictionary, in order to obtain a subset of the features of the first size dictionary, and a second size dictionary being formed from at least the subset of the features of the first size dictionary, the second size dictionary being of lower size than the first size dictionary,
the system being further configured to, for a plurality of files to be fed to the malware detector, by the hardware processor:
extract features from each file based on features present in the second size dictionary, wherein at least a first subset of the files is operable on an operating system which is different from an operating system on which a second subset of the files is operable, wherein the features are independent of operating systems so that a vector is built for each file based on the second size dictionary irrespective of the file operating system, and
build a vector representing said each file based on the extracted features, the vector being suitable for being processed by the deep learning algorithm, for determining the prospects of whether the file constitutes malware or not based on a model of said deep learning algorithm, wherein each vector is suitable to be processed by the same model of the deep learning algorithm.

29. The system according to claim 28, wherein the features comprise at least one of the following features:
operating codes of the files, or
strings present in the content of the files, or
parts of a header of the files, or
strings present in the content of the files, or
strings present in the content of files and parts of a header of files, or
parts of a header of the files, and operating codes of files.

30. The system according to claim 28, wherein the files comprise malware files and non malware files, and the dictionary dictates a size and the content of a vector representing each malware file and non malware file, for real time processing of each vector by the deep learning algorithm.

31. The system according to claim 28, wherein the prospects comprise, for each file, a probability that the file constitutes malware.

32. The system according to claim 28, further being configured to:
feed a plurality of vectors representing a plurality of malware files and non malware files to the deep learning algorithm, and
update a model used by the deep learning algorithm, based on the comparison between prospects provided by the deep learning algorithm whether each file constitutes malware, and a real malware status of each file.

33. The system according to claim 28, further being configured to:
feed the vector representing a file to the deep learning algorithm, and
provide prospects of whether the file constitutes malware or not.

34. The system according to claim 28, further being configured to:
feed the vector representing a file to the deep learning algorithm, and
provide prospects of whether the file constitutes malware or not, even when it has never previously received the file as an input.

35. A system for training a malware detector comprising a deep learning algorithm, the system comprising a hardware processor, the system being configured to, by the hardware processor:
build a first size dictionary, by extracting features from a plurality of malware files and non-malware files,
reduce the size of the first size dictionary, in order to obtain a subset of the features of the first size dictionary, and a second size dictionary being formed from at least the subset of the features of the first size dictionary, the second size dictionary being of lower size than the first size dictionary,
extract features from each file among a plurality of malware and non-malware files, based on features present in at least the second size dictionary, wherein at least a first subset of the files is operable on an operating system which is different from an operating system on which a second subset of the files is operable, wherein the features are independent of operating systems so that a vector is built for each file based on the second size dictionary irrespective of the file operating system,
build vectors based on the extracted features, each vector representing a file,
feed the vectors to the deep learning algorithm, for providing prospects of whether the file constitutes malware or not, and
update a model used by the deep learning algorithm, based on the comparison between prospects provided by the deep learning algorithm based on said model whether each file constitutes malware, and a real malware status of each file, for training the malware detector to provide prospects of whether a file constitutes malware or not, wherein each vector is processed by the same model of the deep learning algorithm.

36. The system according to claim 35, wherein the features comprise at least one of the following features:
   operating codes of the files, or
   strings present in the content of the files, or
   parts of a header of the files, or
   strings present in the content of the files, or
   strings present in the content of files and parts of a header of files, or
   parts of a header of the files, and operating codes of files.

37. The system according to claim 35, further being configured to:
   extract first features from each file among a plurality of malware and non-malware files, based on features present in the second size dictionary, and
   extract second features from each file based on features present in another dictionary of smaller size than the first size dictionary,
   build vectors based on at least the first and second extracted features, each vector representing a file.

38. A system for training a malware detector comprising a deep learning algorithm, the system comprising a hardware processor, the system being configured to, by the hardware processor:
   build a first size dictionary, by extracting features from a plurality of malware files and non-malware files,
   reduce the size of the first size dictionary, in order to obtain a subset of the features of the first size dictionary, and a second size dictionary being formed from at least the subset of the features of the first size dictionary, the second size dictionary being of lower size than the first size dictionary,
   extract features from each file among a plurality of malware and non-malware files, based on features present in at least the second size dictionary, wherein at least a first subset of the files is operable on an operating system which is different from an operating system on which a second subset of the files is operable, wherein the features are independent of the operating systems so that a vector is built for each file based on the second size dictionary irrespective of the file operating system,
   build vectors based on the extracted features, each vector representing a file,
   feed the vectors to the deep learning algorithm, for providing an estimation of the nature of each file,
   update a model used by the deep learning algorithm, based on the comparison between an estimation provided by the deep learning algorithm based on said model on the nature of each file and a known nature of the files, wherein each vector is processed by the same model of the deep learning algorithm.

39. The system of claim 38, wherein the nature of the file is the reputation of the file.

40. A system for training a malware detector comprising a deep learning algorithm and a scoring module, the system comprising a hardware processor, the system being configured to:
   build a first size dictionary, by extracting features from a plurality of malware files and non-malware files,
   reduce the size of the first size dictionary, in order to obtain a subset of the features of the first size dictionary, and a second size dictionary being formed from at least the subset of the features of the first size dictionary, the second size dictionary being of lower size than the first size dictionary,
   the system being further configured to, for each of a plurality of files among a plurality of malware files and non-malware files by the hardware processor:
   extract features from the file based on features present in the second size dictionary, in order to build a first vector representing the file,
   feed the first vector to the deep learning algorithm,
   obtain a first set of prospects on whether the file is a malware or not,
   extract features from the file based on features present in another dictionary, the another dictionary being different from the second size dictionary and of smaller size than the first size dictionary, in order to build a second vector representing the file,
   feed the second vector to the deep learning algorithm,
   obtain a second set of prospects on whether the file is a malware or not; and
   update a neural network used by the scoring module, based on at least the first set of prospects and the second set of prospects, for training the scoring module to provide a decision of whether a file constitutes malware or not.

41. A system for detecting malware, the system comprising a malware detector comprising a deep learning algorithm, the system comprising a hardware processor, the system being configured to, by the hardware processor:
   build a first size dictionary, by extracting features from a plurality of malware files and non-malware files,
   reduce the size of the first size dictionary, in order to obtain a subset of the features of the first size dictionary, and a second size dictionary being formed from at least the subset of the features of the first size dictionary, the second size dictionary being of lower size than the first size dictionary,
   extract features from a file based on features present in at least the second size dictionary,
   build a vector based on the extracted features, wherein the features are independent of operating systems so that a vector is built for the file based on the second size dictionary irrespective of an operating system of the file,
   feed the vector to a malware detector comprising a deep learning algorithm, and
   determine prospects of whether the file constitutes malware or not, based on a model of said deep learning algorithm, wherein said vector is suitable to be processed by said model of the deep learning algorithm irrespective of the file operating system.

42. The system according to claim 41, wherein the features comprise at least one of the following features:
   operating codes of the files, or
   strings present in the content of the files, or
   parts of a header of the files, or
   strings present in the content of the files, or
   strings present in the content of files and parts of a header of files, or
   parts of a header of the files, and operating codes of files.

43. The system according to claim 42, wherein the prospects comprise, for each file, a probability that the file constitutes malware.

44. The system according to claim 42, wherein the files fed to the malware detector are operable on different operating systems and the features are independent of the operating systems so that a vector is built for each file based on the second size dictionary irrespective of the file operating system.

45. The system according to claim 42, configured to provide prospects of whether a file constitutes malware or not, even when the malware detector has never previously received the file as an input.

46. The system according to claim 42, further being configured to:
    extract first features from each file based on features present in the second size dictionary,
    extract second features from each file based on features present in another dictionary of smaller size than the first size dictionary, and
    build vectors based on at least the first and second extracted features, each vector representing a file.

47. The system according to claim 42, wherein the determination of the prospects of a file to constitute malware is done in real time.

48. A system for detecting malware, the system comprising a malware detector comprising a deep learning algorithm, the system comprising a hardware processor, the system being configured to, by the hardware processor:
    build a first size dictionary, by extracting features from a plurality of malware files and non-malware files,
    reduce the size of the first size dictionary, in order to obtain a subset of the features of the first size dictionary, and a second size dictionary being formed from at least the subset of the features of the first size dictionary, the second size dictionary being of lower size than the first size dictionary,
    extract first features from a file based on features present in the second size dictionary,
    build a vector based on the first features,
    feed the vector to the deep learning algorithm, for providing first prospects on whether the file constitutes malware or not,
    extract second features from the file based on features present in another dictionary which is different from the second size dictionary and of smaller size than the first size dictionary,
    build a vector based on the second features,
    feed the vector to the deep learning algorithm, for providing second prospects on whether the file constitutes malware or not,
    provide a result on whether the file constitutes malware or not, based on at least the first and second prospects.

49. The system according to claim 48, wherein the result is provided by a neural network, which is configured to aggregate at least the first and second prospects.

50. The system according to claim 48, wherein the result is a binary result which is provided based on the prospects whose confidence level is the highest.

51. The system according to claim 48, wherein the result is a binary result which is provided based on a voting method.

52. The system according to claim 48, wherein the features of the second size dictionary and of the another dictionary comprise at least one of the following features:
    operating codes of the files, or
    strings present in the content of the files, or
    parts of a header of the files, or
    strings present in the content of the files, or
    strings present in the content of files and parts of a header of files, or parts of a header of the files, and operating codes of files.

53. The system according to claim 48, being configured to feed a plurality of files to the malware detector that are operable on different operating systems, wherein the features of second size dictionary and of the another dictionary are independent of the operating systems.

54. The system according to claim 48, further configured to provide a binary result of whether a file constitutes malware or not, even when the malware detector has never previously received the file as an input.

55. A non-transitory storage device readable by a machine, tangibly embodying a program of instructions executable by the machine to perform a method of building vectors for feeding to a deep learning algorithm of a malware detector, the method comprising:
    building a first size dictionary, by extracting features from a plurality of malware files and non-malware files,
    reducing the size of the first size dictionary, in order to obtain a subset of the features of the first size dictionary, and a second size dictionary being formed from at least the subset of the features of the first size dictionary, the second size dictionary being of lower size than the first size dictionary,
    the method further comprising, for a plurality of files to be fed to the malware detector:
    extracting features from each file based on features present in the second size dictionary, wherein at least a first subset of the files is operable on an operating system which is different from an operating system on which a second subset of the files is operable, wherein the features are independent of operating systems so that a vector is built for each file based on the second size dictionary irrespective of the file operating system,
    building a vector representing said each file based on the extracted features, said vector being suitable for being processed by the deep learning algorithm, for determining prospects of whether the file constitutes malware or not based on a model of said deep learning algorithm, wherein each vector is suitable to be processed by the same model of the deep learning algorithm.

56. A non-transitory storage device readable by a machine, tangibly embodying a program of instructions executable by the machine to perform a method of training a malware detector comprising a deep learning algorithm, the method comprising:
    building a first size dictionary, by extracting features from a plurality of malware files and non-malware files,
    reducing the size of the first size dictionary, in order to obtain a subset of the features of the first size dictionary, and a second size dictionary being formed from at least the subset of the features of the first size dictionary, the second size dictionary being of lower size than the first size dictionary,
    extracting features from each file among a plurality of malware and non-malware files, based on features present in at least the second size dictionary, wherein at least a first subset of the files is operable on an operating system which is different from an operating system on which a second subset of the files is operable, wherein the features are independent of the operating systems so that a vector is built for each file based on the second size dictionary irrespective of the file operating system,
    building vectors based on the extracted features, each vector representing a file,
    feeding the vectors to the deep learning algorithm, for providing prospects of whether the file constitutes malware or not,
    updating a model used by the deep learning algorithm, based on the comparison between prospects provided by the deep learning algorithm based on said model whether each file constitutes malware, and a real malware status of each file, for training the malware detector to provide prospects of whether a file constitutes malware or not, wherein each vector is processed by the same model of the deep learning algorithm.

57. A non-transitory storage device readable by a machine, tangibly embodying a program of instructions executable by the machine to perform a method of training a malware detector comprising a deep learning algorithm, the method comprising:
building a first size dictionary, by extracting features from a plurality of malware files and non-malware files,
reducing the size of the first size dictionary, in order to obtain a subset of the features of the first size dictionary, and a second size dictionary being formed from at least the subset of the features of the first size dictionary, the second size dictionary being of lower size than the first size dictionary,
extracting features from each file among a plurality of malware and non-malware files, based on features present in at least the second size dictionary, wherein at least a first subset of the files is operable on an operating system which is different from an operating system on which a second subset of the files is operable, wherein the features are independent of the operating systems so that a vector is built for each file based on the second size dictionary irrespective of the file operating system,
building vectors based on the extracted features, each vector representing a file,
feeding the vectors to the deep learning algorithm, for providing an estimation of the nature of each file,
updating a model used by the deep learning algorithm, based on the comparison between an estimation provided by the deep learning algorithm based on said model on the nature of each file and a known nature of the files, wherein each vector is processed by the same model of the deep learning algorithm.

58. A non-transitory storage device readable by a machine, tangibly embodying a program of instructions executable by the machine to perform a method of training a malware detector comprising a deep learning algorithm and a scoring module, the method comprising,
building a first size dictionary, by extracting features from a plurality of malware files and non-malware files,
reducing the size of the first size dictionary, in order to obtain a subset of the features of the first size dictionary, and a second size dictionary being formed from at least the subset of the features of the first size dictionary, the second size dictionary being of lower size than the first size dictionary,
the method comprising, for each of a plurality of files among a plurality of malware files and non-malware files:
extracting features from the file based on features present in the second size first dictionary, in order to build a first vector representing the file,
feeding the first vector to the deep learning algorithm,
obtaining a first set of prospects on whether the file is a malware or not,
extracting features from the file based on features present in another dictionary, the another dictionary being different from the second size dictionary and of smaller size than the first size dictionary, in order to build a second vector representing the file,
feeding the second vector to the deep learning algorithm,
obtaining a second set of prospects on whether the file is a malware or not; and
updating a neural network used by the scoring module, based on at least the first set of prospects and the second set of prospects, for training the scoring module to provide a decision of whether a file constitutes malware or not.

59. A non-transitory storage device readable by a machine, tangibly embodying a program of instructions executable by the machine to perform a method of detecting malware, comprising:
building a first size dictionary, by extracting features from a plurality of malware files and non-malware files,
reducing the size of the first size dictionary, in order to obtain a subset of the features of the first size dictionary, and a second size dictionary being formed from at least the subset of the features of the first size dictionary, the second size dictionary being of lower size than the first size dictionary,
extracting features from a file based on features present in at least the second size dictionary,
building a vector based on the extracted features, wherein the features are independent of operating systems so that the vector is built for the file based on the second size dictionary irrespective of an operating system of the file,
feeding the vector to a malware detector comprising a deep learning algorithm, and
determining prospects of whether the file constitutes malware or not, based on a model of said deep learning algorithm, wherein said vector is suitable to be processed by said model of the deep learning algorithm irrespective of the file operating system.

60. A non-transitory storage device readable by a machine, tangibly embodying a program of instructions executable by the machine to perform a method of detecting malware, comprising:
building a first size dictionary, by extracting features from a plurality of malware files and non-malware files,
reducing the size of the first size dictionary, in order to obtain a subset of the features of the first size dictionary, and a second size dictionary being formed from at least the subset of the features of the first size dictionary, the second size dictionary being of lower size than the first size dictionary,
extracting first features from a file based on features present in the second size dictionary,
building a vector based on the first features,
feeding the vector to the deep learning algorithm, for providing first prospects on whether the file constitutes malware or not,
extracting second features from the file based on features present in another dictionary which is different from the second size dictionary and of smaller size than the first size dictionary,
building a vector based on the second features,
feeding the vector to the deep learning algorithm, for providing second prospects on whether the file constitutes malware or not,
providing a result on whether the file constitutes malware or not, based on at least the first and second prospects.

* * * * *